US011570219B2

(12) United States Patent
Masi et al.

(10) Patent No.: US 11,570,219 B2
(45) Date of Patent: Jan. 31, 2023

(54) METHOD, APPARATUS, AND COMPUTER READABLE MEDIUM FOR VIRTUAL CONFERENCING WITH EMBEDDED COLLABORATION TOOLS

(71) Applicant: Re Mago Holding LTD, London (GB)

(72) Inventors: Marco Valerio Masi, Lugano Paradiso (CH); Cristiano Fumagalli, Segrate (IT); Luca Terzaghi, Como (IT)

( * ) Notice: Subject to any disclaimer, the term of this patent is extended or adjusted under 35 U.S.C. 154(b) by 0 days.

(21) Appl. No.: 17/314,755

(22) Filed: May 7, 2021

(65) Prior Publication Data

US 2021/0352120 A1 Nov. 11, 2021

Related U.S. Application Data

(60) Provisional application No. 63/112,916, filed on Nov. 12, 2020, provisional application No. 63/021,428, filed on May 7, 2020.

(51) Int. Cl.
| | |
|---|---|
| *H04L 29/06* | (2006.01) |
| *H04L 65/401* | (2022.01) |
| *H04L 65/403* | (2022.01) |
| *H04L 67/1095* | (2022.01) |
| *H04N 7/15* | (2006.01) |

(Continued)

(52) U.S. Cl.
CPC ........ *H04L 65/4015* (2013.01); *H04L 65/403* (2013.01); *H04L 67/025* (2013.01); *H04L 67/1095* (2013.01); *H04N 7/152* (2013.01); *H04N 7/157* (2013.01); *H04L 51/04* (2013.01); *H04L 65/1093* (2013.01)

(58) Field of Classification Search
CPC . H04L 65/608; H04L 65/4015; H04L 65/403; H04L 67/1095; H04L 67/025; H04L 51/04; H04L 65/1093; H04N 7/152; H04N 7/157
See application file for complete search history.

(56) References Cited

U.S. PATENT DOCUMENTS

| | | | | |
|---|---|---|---|---|
| 2012/0278738 | A1* | 11/2012 | Kruse | G06Q 10/10 715/756 |
| 2013/0227437 | A1* | 8/2013 | Brody | H04L 51/04 715/757 |

(Continued)

FOREIGN PATENT DOCUMENTS

WO WO 2012/0149176 * 11/2012

*Primary Examiner* — Jungwon Chang
(74) *Attorney, Agent, or Firm* — Amardeep S. Grewal; Reed Smith LLP

(57) ABSTRACT

A method, client computing device, and computer-readable medium for virtual conferencing with embedded collaboration tools, including receiving data corresponding to a virtual conference room hosted on a collaboration server and accessible to a plurality of participants on a plurality of client computing devices, the virtual conference room including a communication wall comprising an embedded audiovisual conference window, a collaboration wall comprising an embedded collaborative whiteboard, and an application wall comprising a plurality of embedded application widgets and rendering a three-dimensional representation of at least a portion of the virtual conference room that is customized for a user of the client computing device based at least in part on one or more user parameters associated with the client computing device.

27 Claims, 21 Drawing Sheets

(51) Int. Cl.
  *H04L 67/025* (2022.01)
  *H04L 65/1093* (2022.01)
  *H04L 51/04* (2022.01)

(56) References Cited

U.S. PATENT DOCUMENTS

2013/0283169 A1* 10/2013 Van Wie ................ G06Q 50/01
  715/728
2016/0330404 A1* 11/2016 Nelson ................ H04L 12/1813
2017/0195266 A1* 7/2017 Moyers ................ H04L 65/608

* cited by examiner

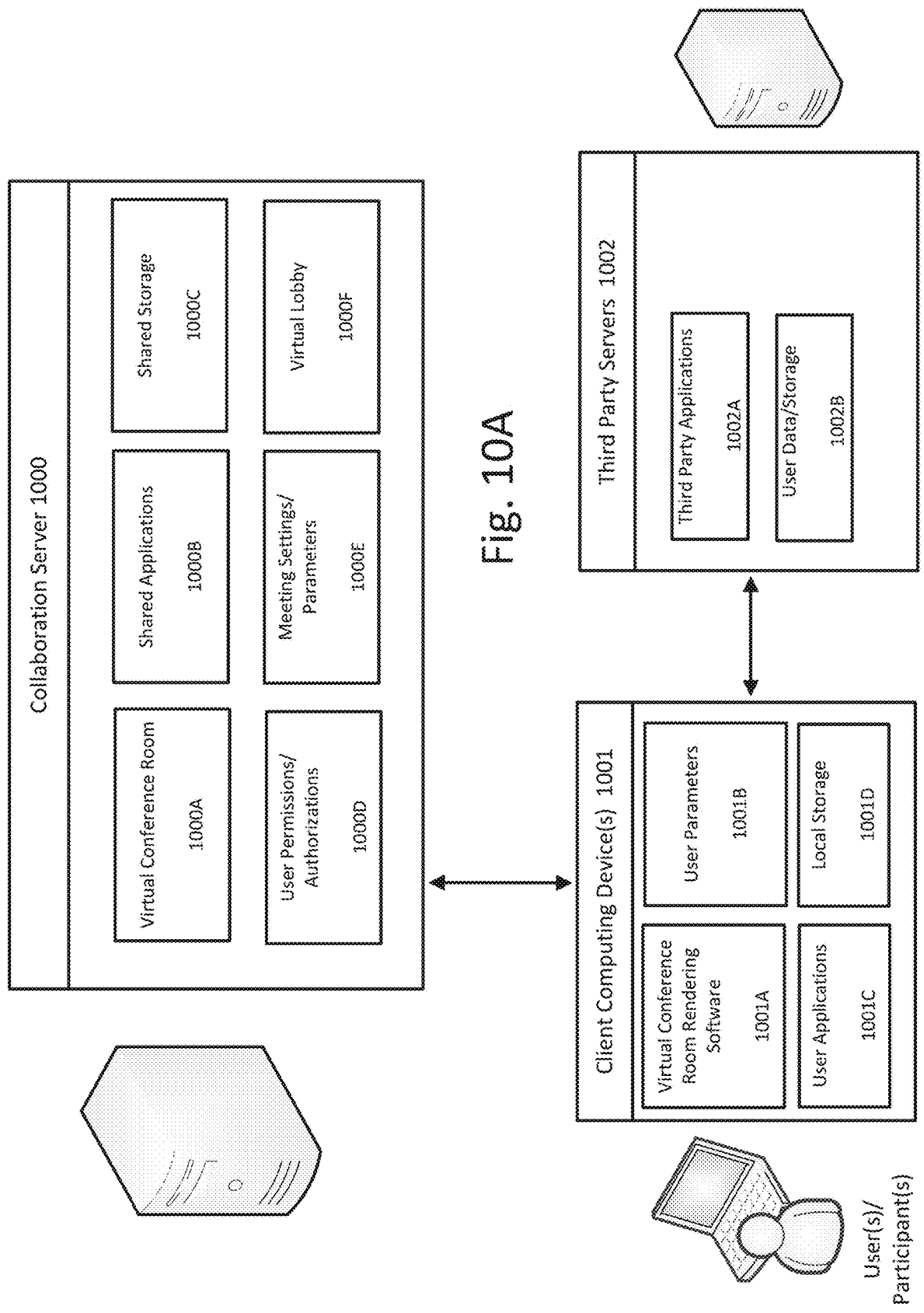

METHOD, APPARATUS, AND COMPUTER READABLE MEDIUM FOR VIRTUAL CONFERENCING WITH EMBEDDED COLLABORATION TOOLS

RELATED APPLICATION DATA

This application claims priority to U.S. Provisional Application No. 63/021,428, filed May 7, 2020, and also claims priority to U.S. Provisional Application No. 63/112,916, filed Nov. 12, 2020, the disclosures of which are hereby incorporated by reference in their entirety.

BACKGROUND

Existing collaboration software solutions typically fall into a number of different categories. One of these categories is video conferencing and teleconferencing software, which allows participants to communicate with one another over an audiovisual stream. Despite the name, these video conferencing solutions do not resemble a physical conference room environment, in which users can exchange notes, edit documents, and share information with others on their laptops or other electronic devices. To the contrary, most videoconferencing and teleconferencing software acts as an extension of a phone call or voice call, permitting participants to speak to one another and see one another, but not much else. While videoconferencing software may include a "presenter" functionality, this accomplishes little outside of allowing other users to view the screen of the presenter.

Another category of collaboration software is collaborative editing software. This software typically uses a whiteboard or other interface which participants can edit concurrently in order to exchange information and conduct brainstorming sessions. While this software enables the exchange of information between users, it is limited to the dimensions and functionality of the whiteboard or other interface, and users cannot collaborate across applications and files in the same way that they would be able to in a real-life setting. Due to the technological difficulty of integrating different applications into the collaboration session, users are typically limited to editing information on a whiteboard interface, rather than across all of the applications that they may ordinarily utilize in the course of their work. Another drawback of collaborative editing software is that this type of software typically relies on chat functionality for communication between users, and is missing the real-time audiovisual communication necessary for effective collaboration.

There are currently no collaboration software solutions which allow users to replicate the experience of a real-life conference room environment, in which users can not only communicate with one another in real time, but also collaborate on documents, applications, and other files, as well as collaborate on a white board. Accordingly, improvements are needed in networked collaboration systems.

BRIEF DESCRIPTION OF THE DRAWINGS

FIGS. 10A-10B illustrates system charts of the computing devices that can be used in the method for virtual conferencing with embedded collaboration tools according to an exemplary embodiment.

DETAILED DESCRIPTION

Figure 1:
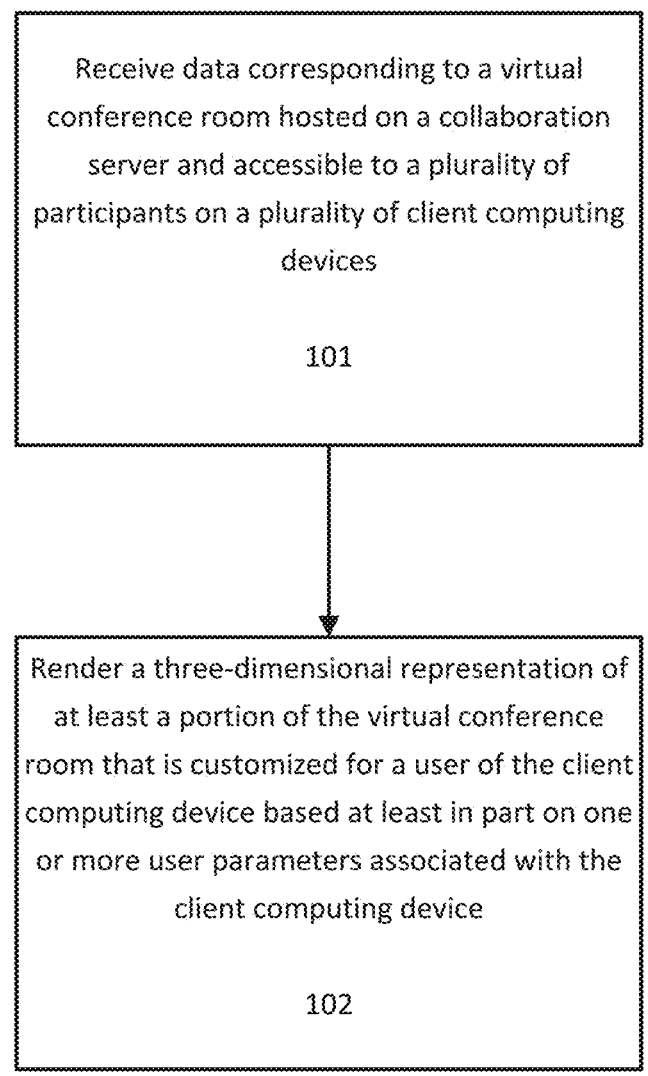
FIG. 1 illustrates a method for virtual conferencing with embedded collaboration tools according to an exemplary embodiment.

While methods, apparatuses, and computer-readable media are described herein by way of examples and embodiments, those skilled in the art recognize that methods, apparatuses, and computer-readable media for virtual conferencing with embedded collaboration tools are not limited to the embodiments or drawings described. It should be understood that the drawings and description are not intended to be limited to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "can" is used in a permissive sense (i.e., meaning having the potential to) rather than the mandatory sense (i.e., meaning must). Similarly, the words "include," "including," and "includes" mean including, but not limited to.

The inventors have discovered a novel method, apparatus (in the form of a client computing device), and computer-readable medium for virtual conferencing with embedded collaboration tools that resolves many of problems with existing collaboration software solutions. The methods, devices, and software disclosed herein enables a group of participants to engage in a collaboration session over a computer network that replicates the functionality, utility, and ambience of a real-world conference room meeting.

Participants to the virtual conference disclosed herein are able to communicate with one another over an audiovisual stream while at the same time sharing notes and ideas on a virtual whiteboard and also collaborating with other within their own applications and software (e.g., Microsoft Word, AutoCAD, Spreadsheets, etc.). The virtual conference solution disclosed herein not only recreates the ambience and feel of a real-life conference room, but also technologically implements many of the real-life benefits previously lacking in collaboration software solutions. As will be explained in greater detail below, a participant to the virtual conference can simultaneously communicate with other participants, jot down notes on a shared whiteboard, and co-edit a document with colleague, all within the virtual conference room itself.

Applicant has also discovered a novel collaboration system, method, and computer readable medium that implements multi-participant collaboration sessions over three separate phases, including a setup phase, a lobby phase, and a room phase. The partitioning of a collaboration session over these phases captures, within the technology platform, many of the advantages of a real-life conference room meeting.

For example, a group of colleagues who are meeting with a group of clients in a conference room may wish to discuss their meeting strategy with one another prior to meeting with the clients. They may also wish to organize their notes or flag the documents for discussion. Current collaboration software throws all participants into the same session initially, making it difficult to collaborate with a subset of the participants. The present system utilizes a lobby phase which allows members, meeting organizers, or some other sub-group of participants to communicate, collaborate, exchange, and co-edit files with one another prior to entering the "virtual conference room," where the other participants await.

FIG. 1 illustrates a method for virtual conferencing with embedded collaboration tools according to an exemplary embodiment. At step 101 data corresponding to a virtual conference room hosted on a collaboration server and accessible to a plurality of participants on a plurality of client computing devices is received by a client computing device. This data can be received in response to the client computing device submitting a request to the server, such as a request to join a particular meeting, or a request to enter the virtual conference room from a different interface.

Figure 2:
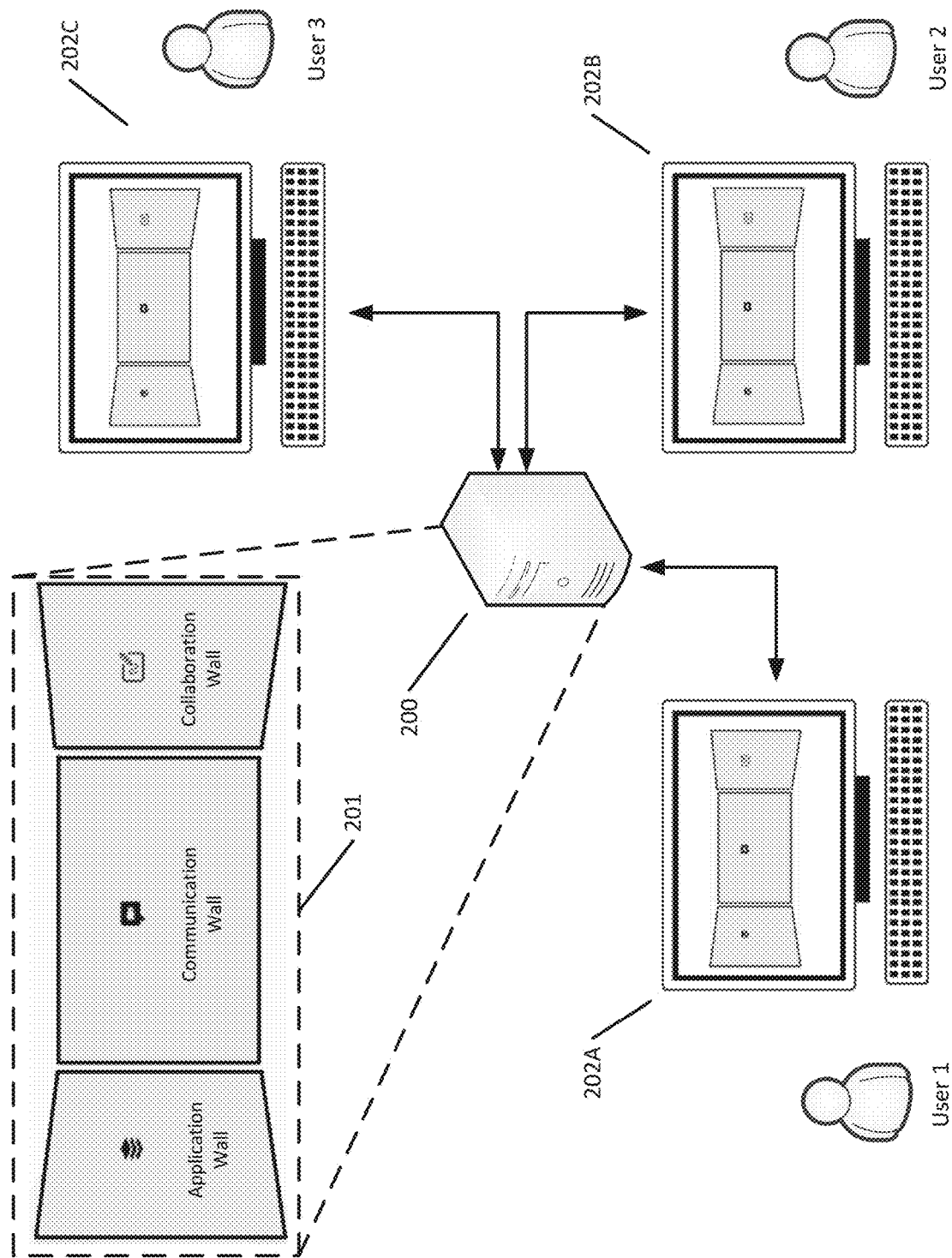
FIG. 2 illustrates the network architecture of the virtual conference room in the present system according to an exemplary embodiment.

FIG. 2 illustrates the network architecture of the virtual conference room in the present system according to an exemplary embodiment. Collaboration server 200 (also referred to as "server") hosts the virtual conference room 201 itself and data corresponding to the virtual conference room is transmitted from the collaboration server 200 to each of a plurality of client computing devices (also referred to as "clients"), such as computing devices 202A, 202B, and 202C.

The data corresponding to the virtual conference room can be transmitted from the collaboration server 200 to the client computing devices in a variety of ways. To save network resources, each client computing device can store virtual conference room rendering software. The server 200 can then transmit the necessary parameters, configuration settings, and any information unique to a particular meeting, set of participants, or single participant to each of the client computing devices. The rendering software on the client can then render an instance of the virtual conference according to the received parameters, configuration settings, and unique information.

Alternatively, bulk of the rendering of each of the virtual conference room instances can be performed on the server, and data corresponding to those instances can be transmitted to each of the clients for client-side rendering (e.g., in a web browser or other client-side application). In this case, the server can store information on each of the clients and the specific rendering to use for each client.

The virtual conference room is a multi-wall interface that includes a plurality of walls, each of which provides a different feature set that is accessible to meeting participants. As shown in FIG. 2, the virtual conference room 201 hosted on the server 200 can have three walls, including a communication wall, a collaboration wall, and an application wall. However, the multi-wall interface can also have two walls or greater than three walls, and this example is not intended to be limiting. In the situation where more than four walls are used, the additional walls can be rendered the as a "ceiling" or a "floor" in the virtual conference room and/or the layout of the virtual conference room can be set to be a polygonal shape with 5+ walls, such as a pentagon (5 walls) or an octagon (8 walls).

Additionally, Applicant notes that the number of walls in the virtual conference room hosted on the server can differ from the number of walls in an instance of the virtual conference room rendered on a particular client computing device. This can be, for example, based on the user parameters of a user of the client computing devices, such as a user authorization level, user sub-group, or user membership status. This can also be based on server settings or meeting setting regarding which walls should be displayed to which users. For example, some users can see only the communication wall and the collaboration wall in their virtual conference room, whereas other users can see the communication wall, the collaboration wall, and the application wall.

Figure 3:
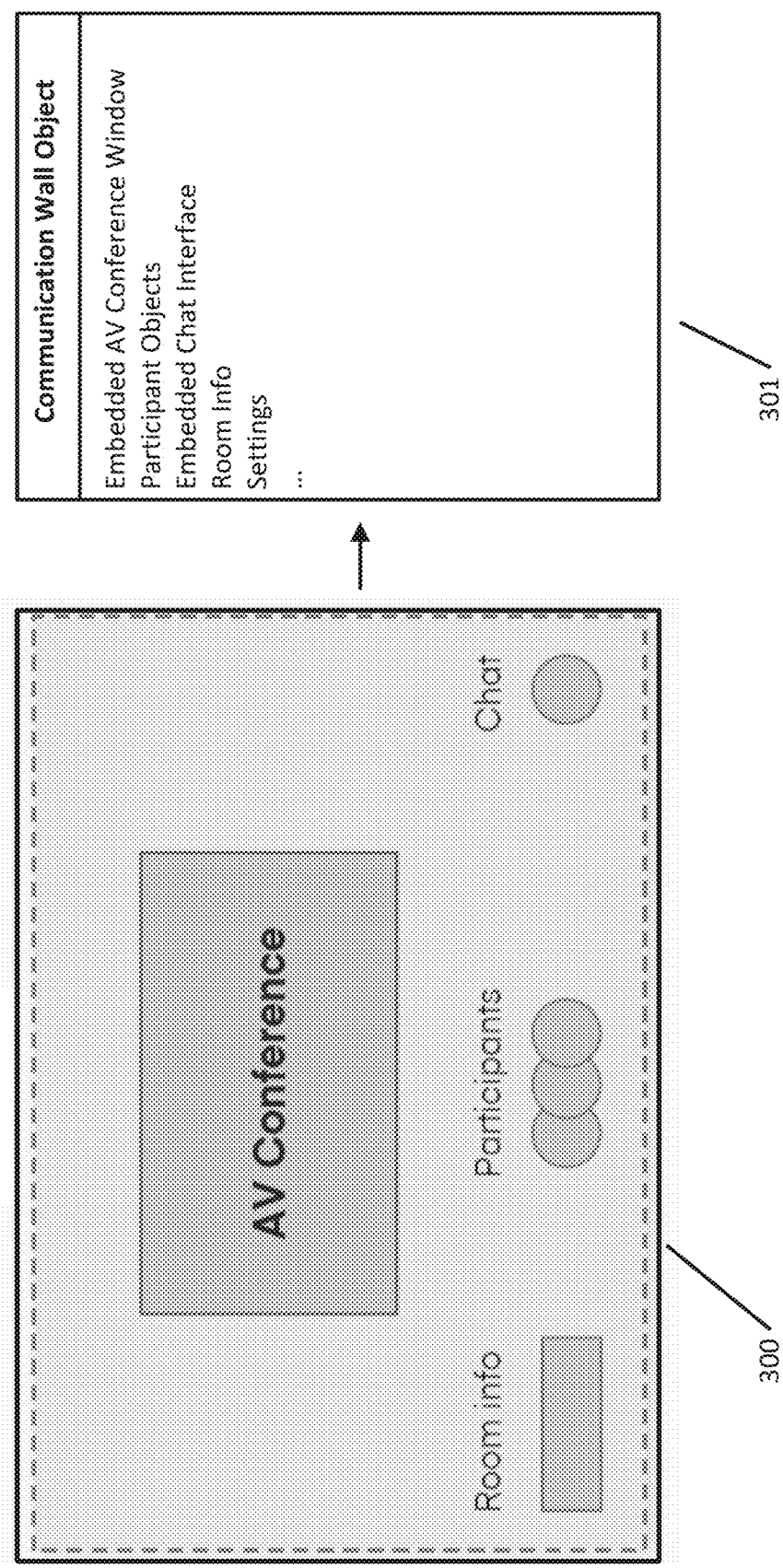
FIG. 3 illustrates a communication wall according to an exemplary embodiment.

The functionality and features of the communication wall, the collaboration wall, and the application wall are described in greater detail below. In the implementation where the multi-wall interface includes two walls, the functionality and features described below with respect to the three wall interface implementation can be distributed over the two walls instead of three. Alternatively, in the implementation where the multi-wall interface has greater than three walls, some of the features described below with respect to the three wall interface implementation can be distributed over four or more walls FIG. 3 illustrates a communication wall 300 according to an exemplary embodiment. The communication wall can structured and stored in memory as a communication wall object. Wall objects are discussed in greater detail below and can take a number of different forms and are a specialized data structure that stores sub-objects that make up the wall. These sub-objects can be specific data structures and/or pointers to other objects, streams, or applications, as well as configuration data and settings. The settings can indicate, for example, where each sub-object appears within the wall, the appearance of each sub-object, user permissions, rendering parameters, etc.

Box 301 shows the objects that are part of the communication wall object. The communication wall 300 includes an embedded audiovisual ("AV") conference window configured to output an audiovisual stream of the participants in the virtual conference room. The audiovisual stream can include video streams captured by the cameras of the participants on client devices and/or audio streams captured by the microphones of the participants on client devices. Each participant can toggle, from their client computing device, which streams to share within the virtual conference room, if any. The embedded audiovisual conference window can include a pointer or other reference to one or more streaming objects corresponding to the audio and/or video streams from the participants. These streams can then be dynamically populated when an instance of the virtual conference room is rendered.

As shown in box 301, the communication wall object additionally includes participant objects, such as icons, text, etc. Communication wall object additionally included an embedded chat interface, room/meeting information, and settings for the communication wall or any of the sub-objects within the communication wall. The room information interface element provides information about the particular room (e.g., title, subject, meeting info, company, etc.). Additionally, the chat indicator allows a user to engage in a direct chat with one or more other users. All icons can be configurable and/or movable by users. For example, a participant can adjust the position of the participant icon, the AV window, the room info, and/or the chat interface.

Figure 4:
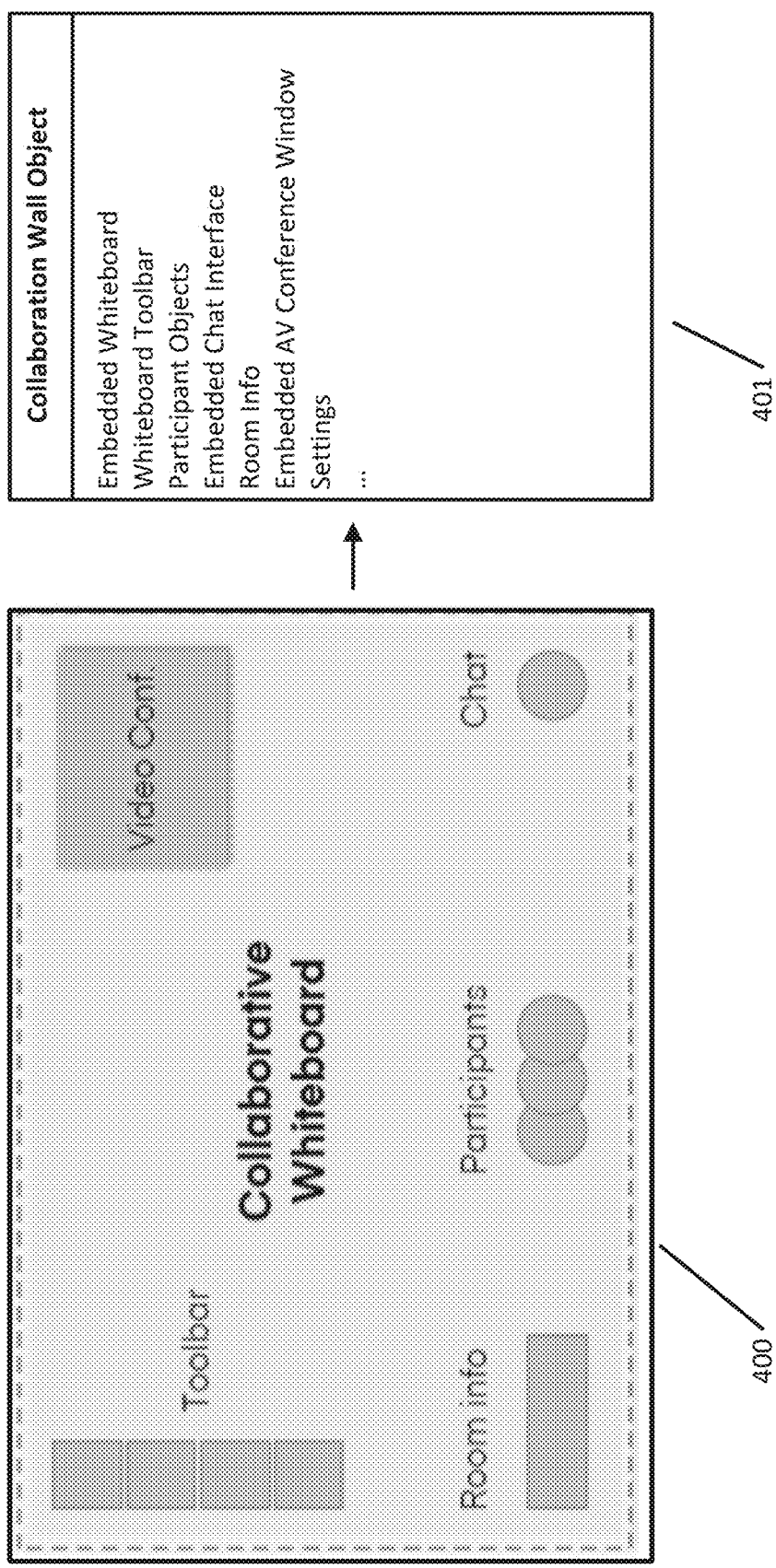
FIG. 4 illustrates a collaboration wall according to an exemplary embodiment.

FIG. 4 illustrates a collaboration wall 400 according to an exemplary embodiment. The communication wall can structured and stored in memory as a collaboration wall object. As discussed previously, wall objects can take a number of different forms and are a specialized data structure that stores sub-objects that make up the wall. These sub-objects can be specific data structures and/or pointers to other objects, streams, or applications, as well as configuration data and settings.

Box 401 shows the objects that are part of the collaboration wall object. The collaboration wall 400 includes an embedded collaborative whiteboard, the collaborative whiteboard being configured to propagate edits by any participant to other participants in the plurality of participants. The whiteboard is synchronized to all users so that edits by any user are propagated to all users concurrently. The collaboration wall 400 additionally includes a toolbar with tools for editing and interacting with the whiteboard. The whiteboard toolbar and feature set is described in greater detail in U.S. Non-Provisional application Ser. No. 16/054,328, filed Aug. 3, 2018, the disclosure of which is hereby incorporated by reference in its entirety. As shown in box 401, the collaboration wall 400 maintains the AV conference in a window view, as shown in the upper right-hand corner of the collaborative whiteboard wall. The collaboration wall 400 additionally maintains the room info interface element, participant icons, and chat interface and icons/indicators. The collaboration wall object additionally includes settings, which can indicate where each sub-object appears within the wall, the appearance of each sub-object, user permissions, rendering parameters the particular toolset for the whiteboard, whiteboard configuration, etc. Once again, all icons are configurable, movable, and adjustable by the user.

Figure 5:
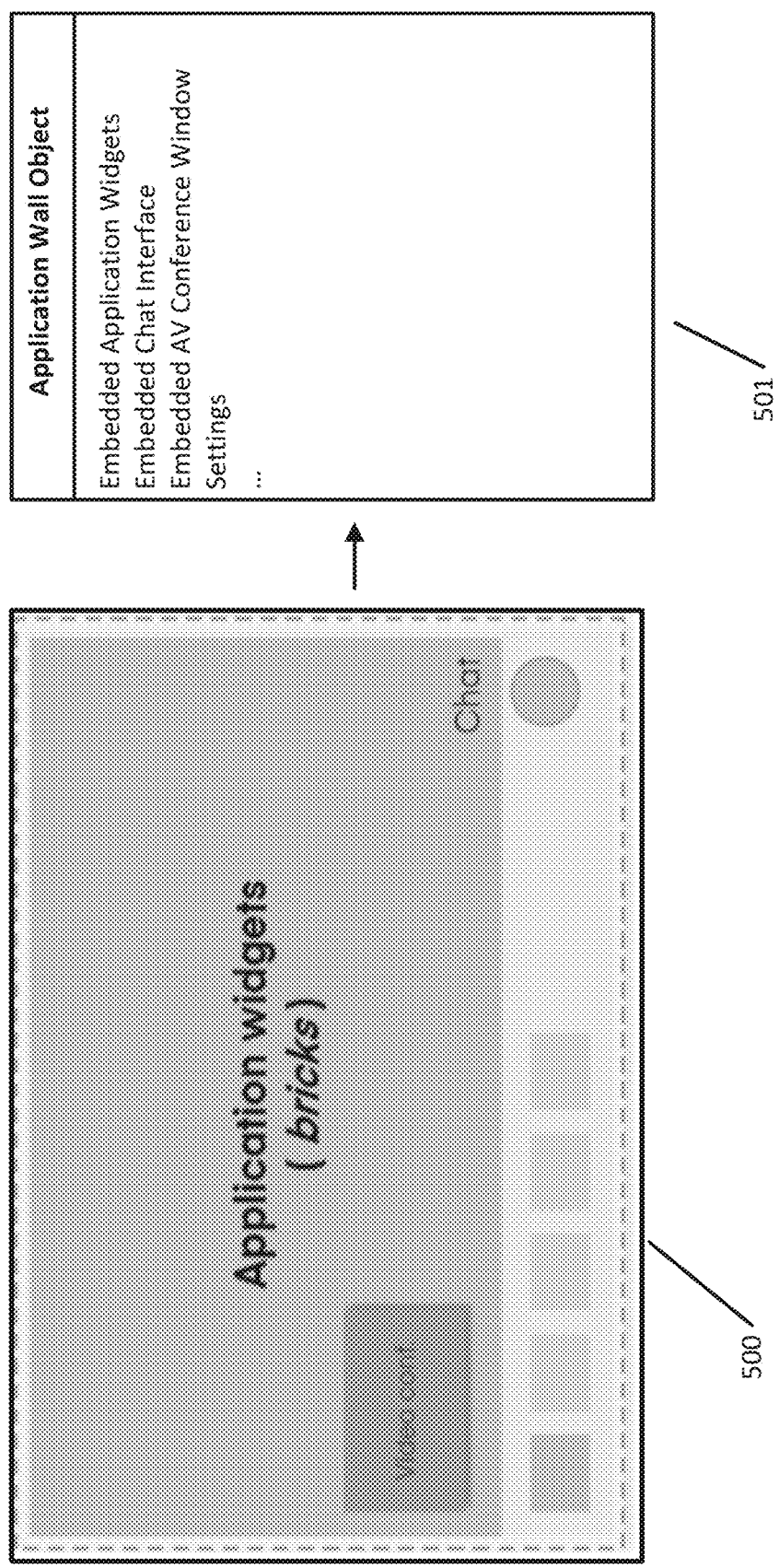
FIG. 5 illustrates an application wall according to an exemplary embodiment.

FIG. 5 illustrates an application wall 500 according to an exemplary embodiment. The application wall can structured and stored in memory as an application wall object. As discussed previously, wall objects can take a number of different forms and are a specialized data structure that stores sub-objects that make up the wall. These sub-objects can be specific data structures and/or pointers to other objects, streams, or applications, as well as configuration data and settings.

Box 501 shows the objects that are part of the application wall object. Similar to the other walls, the application wall maintains the chat interface and the embedded AV conference window, which is presented in a minimized format. The application wall object additionally includes settings, which can indicate where each sub-object appears within the wall, the appearance of each sub-object, user permissions, rendering parameters, application configuration and settings of various applications, stored application logins, passwords, or authentication, a list of local applications, server application or third-party applications accessible to the user etc.

The chat interface can be embedded in each of the walls (e.g., the collaboration wall, the communication wall, the application wall, etc.) and can link or reference a global chat application that remains consistent regardless of which wall a particular user is interacting with. For example, if a user switches between the application wall and the collaboration wall, the chats displayed within the chat interface will remain the same on both walls. The chats entered into the chat interface can be stored or recorded as a chat transcript, and the chat transcript associated with each meeting can be stored in a container (e.g., a file, a document, a data structure) that corresponds to a meeting identifier of the meeting in which the chat took place. This can container can be stored on a shared drive or storage on the server (e.g., cloud storage) accessible to all participants. A copy of the chat transcript can also be stored locally on one or more of the client devices (e.g., the user can request to download the chat transcript through some user interface element of the virtual conference room).

The application wall includes a plurality of embedded application widgets (also referred to herein as "bricks" or "widgets"). A widget is a user interface element that includes or is linked to an application, tool, or some functionality that executes within the user interface element. As discussed below, each widget can vary in appearance, dimensions, or other characteristics and can change size or shape depending upon user actions.

Each embedded application widget can be linked to an application (also referred to herein as "app") configured to execute on one or more client computing devices in the plurality of client computing devices. Embedded application widgets can also be linked to applications hosted on the collaboration server or a third-party server. In this case, a client-side application can execute on a client computing device and communicate with a corresponding server-side application executing on the collaboration server or third-party server (e.g., Google Cloud, Dropbox, etc.). Note that the embedded application widgets can correspond to particular files, folders, or storage locations, in which the case the linked application is a file/folder viewing application.

Each embedded application widget is configured to receive user input to the linked application and display application output of the linked application. The user input is received through the embedded application widget (which is within the application wall, itself within the virtual conference room) and directed to the executing application itself. This can be accomplished in a number of ways, as explained below.

One way is to have the embedded application widget instantiate the application itself and set the application window of the application to correspond to the dimensions and position of the embedded application widget within the wall. In this case, the user is actually interacting directly with the executing application, although it appears as an embedded application widget within the application wall.

Another way is to track the user input location on the screen/interface itself (e.g., X and Y coordinates captured based on a position of a pointing device or touch input) and also record the user input values (e.g., from a keyboard buffer). The input locations can then be mapped to a particular embedded application widget that is displayed on a region of the interface that contains the input location using a screen buffer to map from the input location to the relevant widget. The actual input values can then be passes to the application corresponding to that embedded application widget. The input values and location can be detected and passed to the executing application in part by a transparent layer executing on the client computing device, as described in U.S. Non-Provisional application Ser. No. 15/995,878, filed Jun. 1, 2018, the disclosure of which is hereby incorporated by reference in its entirely ("the '878 Application").

As explained in the '878 Application, the transparent layer is an API configured to interface between the system drivers and an operating system and/or application(s) executing on the operating system. The transparent layer 203 can be part of a software process running on the operating system and can have its own user interface (UI) elements, including a transparent UI superimposed on an underlying user interface and/or visible UI elements that a user is able to interact with. The transparent layer can interface with the operating system API, as well as the APIs of any applications executing on the operating system, and can, for example, pass inputs/data to a particular application, capture output from a particular application, and detect screen coordinates of an input and identify an appropriate application.

The above-mentioned method of passing user input to the application linked to the embedded application widget can be utilized to pass input to applications that are executing on a remote computing device, as explained in the '878 Application. In particular, once the application linked to the embedded application widget is determined, the collaboration software can determine where that application is executing (e.g., on another participant's computing device, on the collaboration server) and transmit the input along with the input location within the embedded application widget to the appropriate destination, via the collaboration server. The remote computing device can then receive the input and the location and map it to the appropriate input on the locally executing application, using the transparent layer. In this way, remote participants in the virtual conference room can optionally control and provide input to an application executing on a local participants computing device, and vice versa. This setting (to allow remote user input) can be configured and set by the local participant and/or the meeting administrator or presenter.

The application output of the linked application is also displayed within the embedded application widget. In the scenario where the application itself is instantiated within the embedded application widget, this will occur as a matter of course, as the application updates in response to the user input. If the application is executing in the background or on a remote computing device, then the output of the application can be sized appropriately and mapped to the dimensions of the embedded application widget, so that it is presented within the embedded application widget itself.

The application wall is an interface that allows participants of the collaboration/virtual meeting to edit, add, access, view, and use applications from within the collaboration session. As explained above, the application wall includes a number of "widgets" or "bricks" corresponding to different applications, folders, or files that a meeting participant can interact with.

The application wall can be configured to operate in two modes, it can either be independently controlled by each participant (such that each participant views their own version of the application wall and can interact independently with the applications on the application wall) or can be configured to be synchronized across participants, such that actions on the application wall by one participant are shared to other participants.

Optionally, the mode of the application wall can be toggled between the two variations. For example, an administrator or host of the collaboration session can toggle the application so that they (or another participant) act as a "presenter" for other participants and other participants see their actions on the application wall and the applications they have opened and interacted with. The administrator or host can also toggle the presenter mode off so that each participant can independently interact with the application wall.

As discussed above, the application wall is a container of applications presented as embedded application widgets or bricks. The room administrator can setup and define which apps are available on the application wall. In one implementation, every room member can have access to the apps but room guests will not have access to the application wall. In other variations, all participants have access to an application wall.

The apps on the on application wall can be default apps or custom apps. The default apps are automatically visible and available to the room members/participants. These apps can be configured by a system administrator or the provider of the collaboration service or the room administrator.

The embedded application widgets include a file sharing application widget corresponding to a file sharing application (referred to as the Room Library), the file sharing application being configured to store one or more files associated with each meeting conducted in the virtual conference room in a container corresponding to a meeting identifier of the meeting. As discussed previously, the container can be stored on the server and/or copied to a client computing device.

The Room Library is the primary default app for the application wall and serves as a bucket for files coming from the whiteboard, recaps, snapshots, files coming from the AV conference, AV recordings, imported/added files and objects, any files that are dragged and dropped into the Room Library, such as images, videos, links, emails, and sticky notes, snapshots coming from custom apps, screenshots of a custom app frame, taken via a specific «Snapshot» button. For example, a room library can host files that pre-loaded for a specific meeting (such as word docs, powerpoint presentations) by participants/administrators. Any file in the application wall can be viewed and quickly imported into the collaborative whiteboard for immediate use.

Custom Apps can be simple html pages, fixed objects (e.g. image, video, document), non-authenticated web app instances, and/or authenticated (federated) web app instances. In case of apps that need authentication, every member self-authenticates to the app through federation. Each participants own authenticated session persists even after exiting the Room.

Non-authenticated web app examples include: a YouTube Video, a Google map, a Publicly accessible document, a stock chart website.

Federated web app examples include: File Storage systems, such as Google Drive/OneDrive, Shared online documents (Google Sheets, Office 365), Shared team boards (Trello, Jira), and Shared 3rd-party whiteboards (Miro, Jamboard).

Custom apps are very useful for integrating information from external sources into the Room, to be easily and quickly accessed during meetings. For example, a mapped OneDrive folder that contains legal/accounting documents into an «Accounting Room». Custom apps are also very useful for keeping persistent information in a single container (Room). For example, a Trello todo list/kanban board and a Knowledge base document into a «Developers Room», that eliminates the need for members/participants to re-open many instances of different web applications ("webapps") during meetings on a specific topic. Custom apps additionally allow for collaborating on the same authenticated webapp, leveraging the other 2 walls with AV/Chat and Visual Collaboration tool, all in one place. This can be used to work on a Google Document in real time, without having to open an external AV/Chat tool for communicating or visual collaboration whiteboard for brainstorming.

Figure 6A:
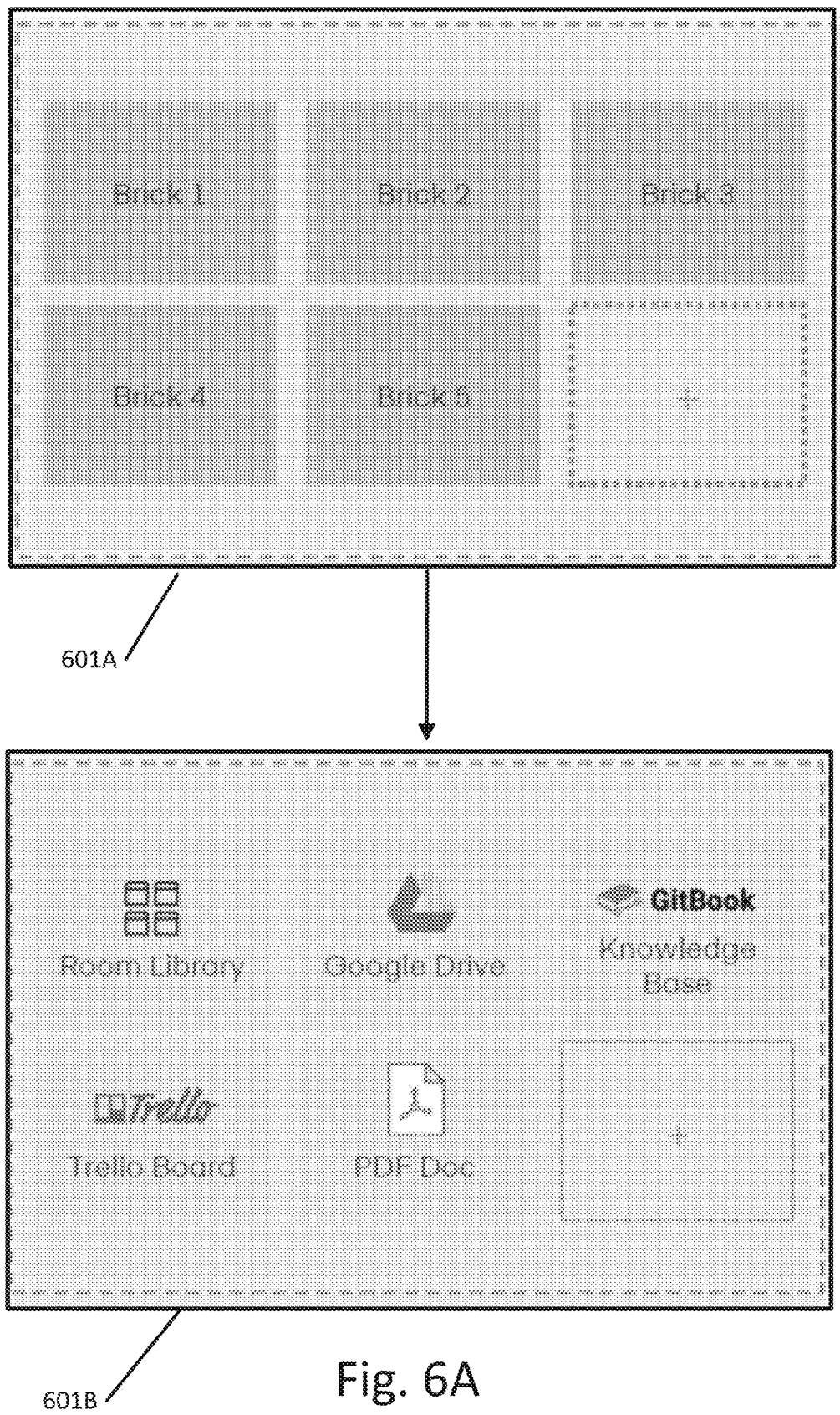
FIGS. 6A-6C illustrate different views of the application wall according to an exemplary embodiment.

The bricks/widgets of the application wall can be viewed in different modes. FIG. 6A illustrates a "big tiles view" 601A according to an exemplary embodiment. The big tiles view can be set to be the default view. In this view each of the apps, the default apps, the most common apps, or some subset of the apps, are enlarged to allow for easy selection/activation of a brick/app, along with an indicator/selector ("+") that allows the participants to add new applications to the application wall. FIG. 6A also illustrates the big tiles view with some examples of apps 601B that can be presented in the application wall according to an exemplary embodiment.

Figure 6B:
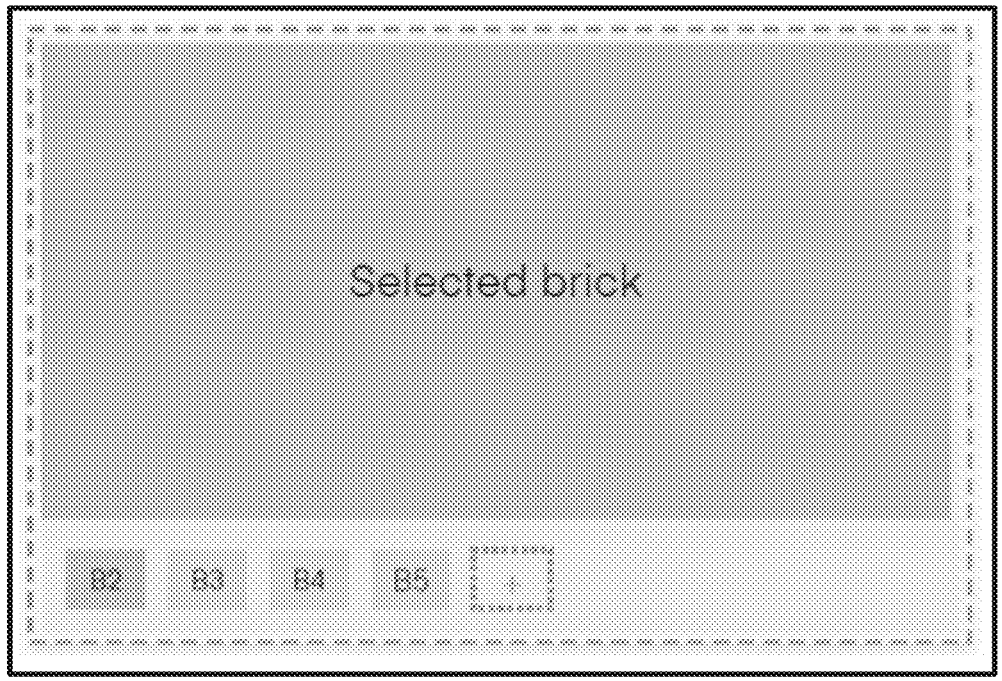

FIG. 6B illustrates a "focus view" 602 that can be toggled once a user selects a brick in the big tiles view according to an exemplary embodiment. The non-selected apps are displayed in smaller tiles along the bottom of the view and the selected brick is displayed in a large box/window in the center of the app wall.

Figure 6C:
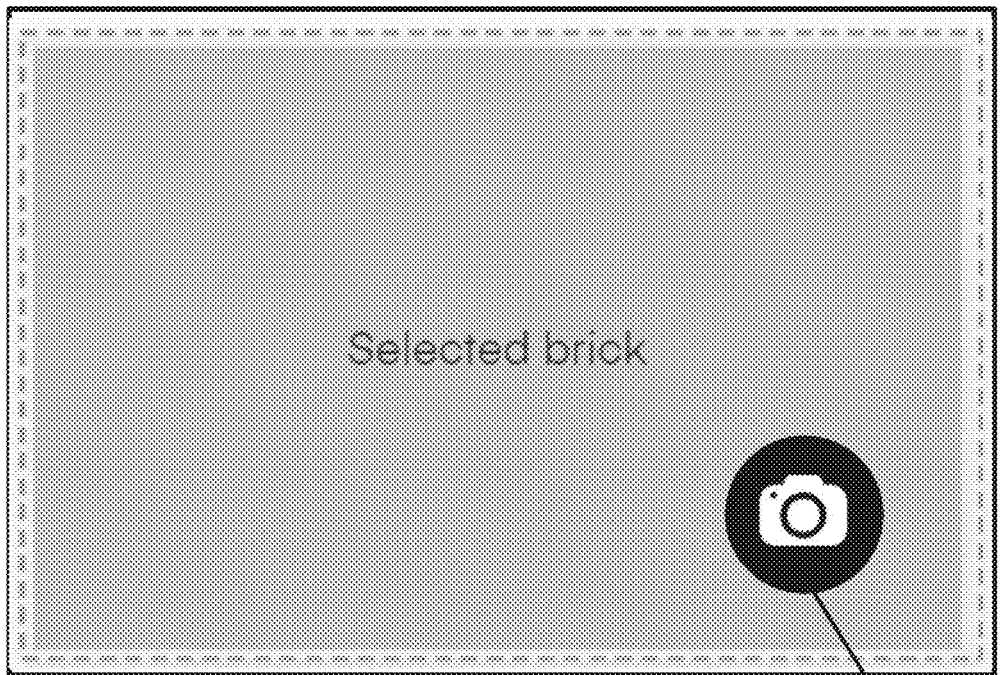

FIG. 6C illustrates a "full screen view" 603 which can be entered from the focus view according to an exemplary embodiment. The full screen view maximized the selected app and removes tiles corresponding to other apps. The full screen view can include a snapshot button 604 that allows participants to take a screenshot of the current app. This screenshot can be automatically saved to the room library and/or exported to the whiteboard.

Figure 7:
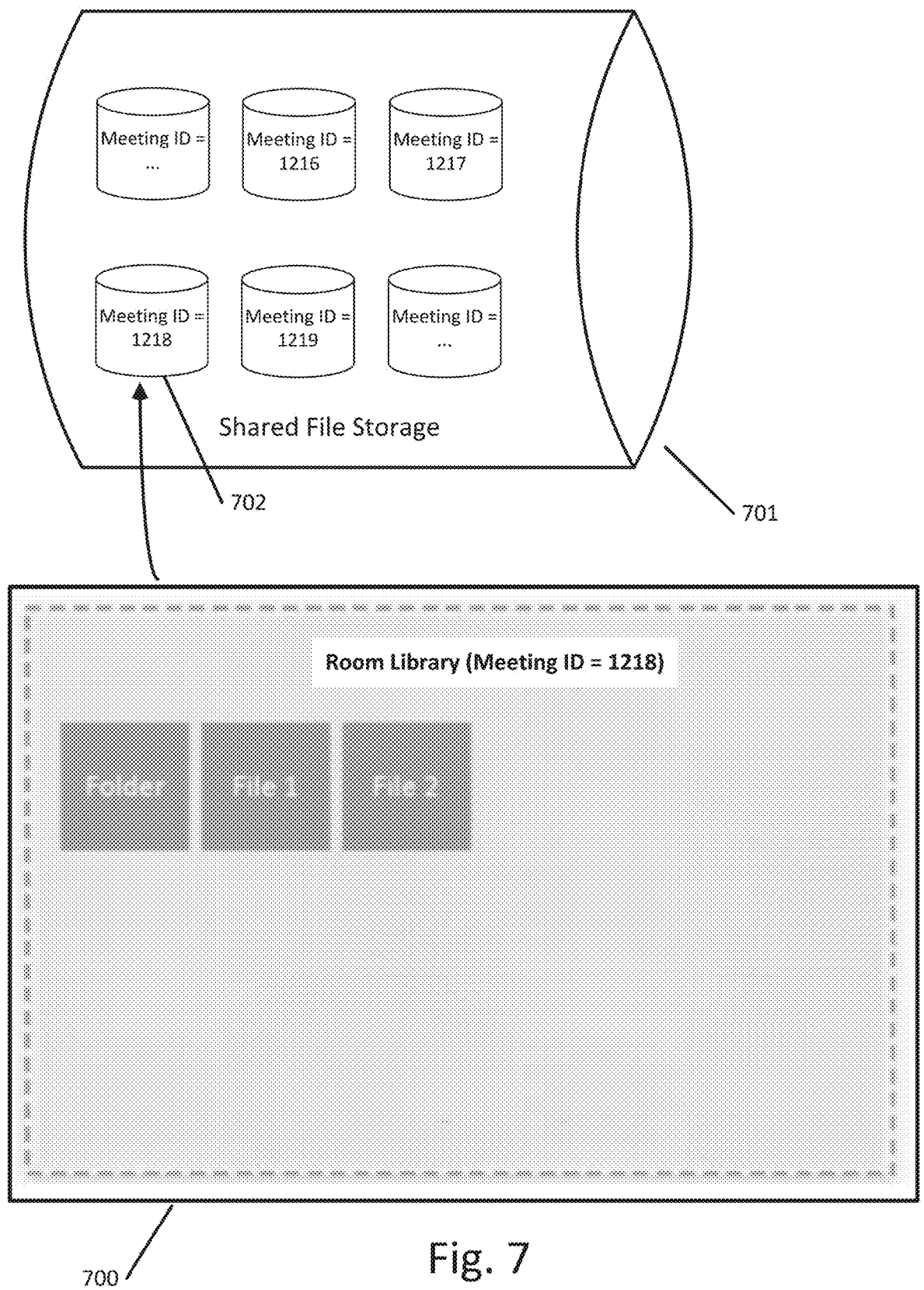
FIG. 7 illustrates an interface for the Room Library app according to an exemplary embodiment.

FIG. 7 illustrates an interface for the Room Library app 700 according to an exemplary embodiment. The Room Library app 700 displays folders and fields accessible to a participant through the corresponding embedded application widget. A drag and drop interface can be used to move folders and files into/out of the room library. As shown in FIG. 7, Room Library is a file sharing application that is configured to store one or more files associated with each meeting conducted in the virtual conference room in a container 702 corresponding to a meeting identifier of the meeting. The container 702 can be part of a shared file storage system 701.

Returning to FIG. 1, at step 102 a three-dimensional representation of at least a portion of the virtual conference room is rendered and displayed on a user interface of the client computing device. This three-dimensional representation, referred to as an instance, is customized for a user of the client computing device based at least in part on one or more user parameters associated with the client computing device. As explained in further detail with respect to FIGS. 10A-10B, the rendering can be performed primarily on the client computing device and/or on the collaboration server and then transmitted to the client.

The user parameters can include any user related information, such as user membership status, user location or IP address, user computing device/hardware information/software information, user name, user groups, user permissions, user authorization levels, user preferences, user authentication, or user history.

User parameters can also include information about graphical preferences (e.g., icons, color palette, format, etc.) and about applications accessible to the user, applications stored on the client computing device of the user, preferred applications, application configuration or settings, user logins or password, user application authentication status, or other user information that can be used to determine whether to render the application wall and how to populate the application wall with embedded application widgets.

The user parameters can be stored on the client computing device and accessible to the virtual conference software. The user parameters can alternatively or additionally stored on the collaboration server or determined by the collaboration server. For example, when a user joins a particular meeting as a participant, the server can receive the user information, analyze or process the user information, and set one or more user parameters, such as authorization level, permissions, or configuration settings. These user parameters can then be stored at the server and/or sent to the client computing device.

The user parameters are utilized by the rendering software on the client and/or the server to render the instance (i.e., the three-dimensional representation) of the virtual conference room for each participant of the, as well as to render the specific components of the virtual conference room, including the application wall, the embedded application widgets, and other features.

Figure 8:
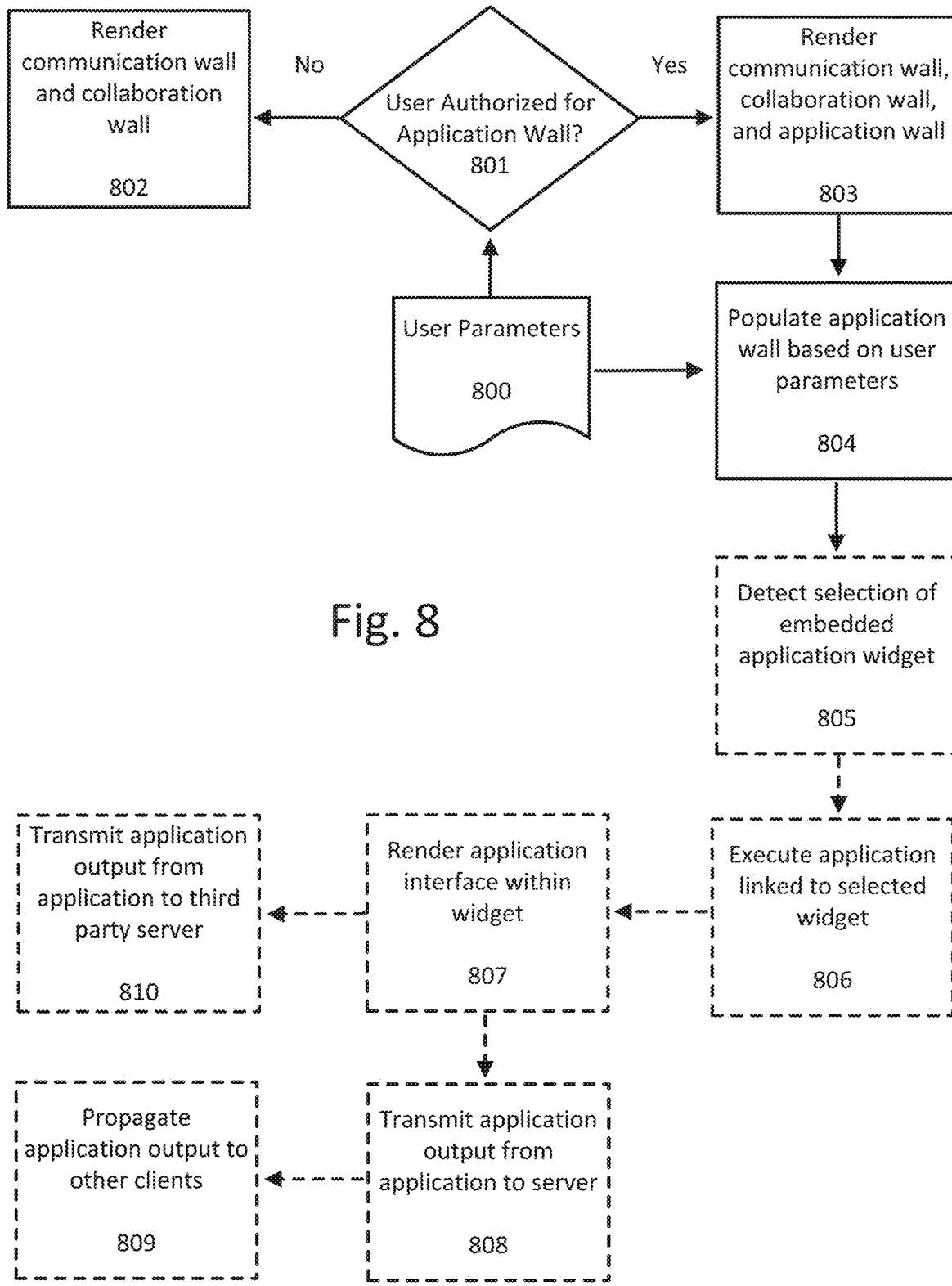
FIG. 8 illustrates a flowchart for rendering a three-dimensional representation of at least a portion of the virtual conference room that is customized for a user of the client computing device based at least in part on one or more user parameters associated with the client according to an exemplary embodiment.

FIG. 8 illustrates a flowchart for rendering a three-dimensional representation of at least a portion of the virtual conference room that is customized for a user of the client computing device based at least in part on one or more user parameters associated with the client according to an exemplary embodiment. Steps 801-805 correspond to the step of rendering the three-dimensional representation of at least a portion of the virtual conference room that is customized for a user of the client computing device based at least in part on one or more user parameters and can be performed by the rendering software on a client computing device and/or a server computing device. Steps 806-811 correspond to additional steps that can be performed by the client and/or server (depending on the specific step) after the initial rendering.

At step 801 it is determined whether the user is authorized for an application wall based at least in part on the one or more user parameters 800, which are input to step 801. As discussed previously, these parameters can include a user membership status (whether the user is a member of the collaboration service/software or is a guest user), user permissions, user security settings, user location, user groups or subgroups (for example, if one group of members is presenting to another group of members, the second group can be blocked from accessing the application wall), user presenter status, etc.

Each user can be assigned a set of authorizations and permissions when they enter a room. For example, when a room is entered, users can be assigned an authorization status based upon access control list (ACL) rules and/or role-based access control rules (RBAC). Guests to a room can have limited access relative to members of an organization that is associated with the owner/manager of a room. The room, user interface, each of the walls, and the applications within the application wall are then rendered according to their roles and permissions. Optionally, certain walls, such as the application wall, can be limited to members of the collaboration service and be invisible/unrendered for guests to collaboration sessions.

The determination of step 801 can be performed at the server or at the client. For example, a server can assign an authorization status based upon user parameters sent from the client to the server when the user joins the meeting. If the server is performing rendering, the server can then use the authorization status to determine if the user is authorized for the application wall. Alternatively, the server can pass the authorization status back to the client. If the client is performing rendering then the client can use the authorization status to determine if the user is authorized for the application wall.

Additionally, the client can also determine authorization status rather than the receiving the authorization status from the user. For example, the client can store a set of rules associated with the meeting (e.g., provided by the server) and use the rules to evaluate the one or more user parameters and determine an authorization status. This authorization status is then used in step 801 to determine if the user/client computing device is authorized for the application wall.

If the user is not authorized for the application wall, then the process proceeds to step 802. At step 802 the rendering software (on the client and/or the server) renders only the communication wall and the collaboration wall based at least in part on a determination that the user is not authorized for an application wall.

If the user is authorized for the application wall, then the process proceeds to step 803. At step 803 the rendering software (on the client and/or the server) renders the communication wall, the collaboration wall, and the application wall based at least in part on a determination that the user is authorized for an application wall.

The step of rendering a three-dimensional representation of at least a portion of the virtual conference room that is customized for a user of the client computing device based at least in part on one or more user parameters can further include customizing aspects/appearance/content of one or more walls of the virtual conference room.

At step 804 the rendering software populates the application wall with one or more embedded application widgets corresponding to one or more applications that are selected based at least in part on the one or more user parameters associated with the client computing device. As shown in FIG. 8, the user parameters 800 are also input to step 804. The selected embedded application widgets can correspond to applications including, for example, default applications, custom applications, local applications detected on the client computing device, applications specified by or associated with the user or a member account, applications relating to the purpose of the meeting, applications selected based on presenter status of the user, applications based on the computing configuration, software configuration, or operating system of the client computing device, or any other applications selected based on upon the user parameters.

In addition to the choice of embedded application widgets, the application wall can also be customized according to the preferences of the user. For example, the appearance, color, dimensions, icons, sub-objects, and presentation style (e.g., full screen, focus view, tile view, etc.) of the application wall can all be rendered according to user preferences specified in the user parameters, which can be stored on the client computing device or the collaboration server.

Steps 805-810 relate to possible user actions during the meeting itself. At step 805 the client computing device can detect selection of an embedded application widget in the one or more embedded application widgets by a corresponding user. The selection can include, for example, a touch, keyboard, or pointing device input or a voice command. As discussed below, if the user is a presenter, this selection can be transmitted to the server and propagated to other computing devices. The application corresponding to the selected embedded application widget will typically be on the client device. However, if the application corresponding to the selected embedded application widget is itself executing remotely (such as on the server or on a remote client device), then the selection can forwarded to the server to take appropriate action or forwarded to the remote client device (via the server) to take appropriate action.

At step 806 the application linked to the selected embedded application widget is executed. If the application is stored on the client device, it can be executed locally. If the application is a server application stored on the server, then the client device can transmit an instruction to the server to execute the application. Additionally, if the application is stored on a remote client device, then the client device can transmit an instruction to the remote client device (via the server) to execute the application. Typically, even server applications will have some local counterpart stored on the client device (such as stub), and these local applications can be executed in order to gain access to the additional functionality stored server-side. The local counterpart can be, for example, an applet or other browser functionality or a stand-alone application.

In addition to executing the application, the application wall can also automatically be modified to emphasize the selected embedded application widget. For example, the embedded application widget can be enlarged in a focus or full screen view. These settings can be customized by each user or based upon the specific application.

At step 807 the application interface of the application is rendered within the selected embedded application widget, which is itself within the application wall of the virtual conference room. As discussed previously, this rendering within the virtual conference room can be performed by instantiating the application itself and setting the application window of the application to correspond to the dimensions and position of the embedded application widget within the wall. The application can also be executed in the background of the client computing device (so that a new window is not opened for the application) and the screen output of the executing application can be mapped to a container within the application wall corresponding to the embedded application widget. For example, the screen buffer for the application window can be captured, stored, and then transmitted within the embedded application widget.

The rendered application interface within the embedded application widget is configured to receive user input to the linked application and to display the application output. The display process is discussed in the preceding paragraphs. Additionally, as explained earlier in this disclosure, the user input can be routed from the embedded application widget to the executing application in various ways.

One technique for receiving input, described earlier, includes having the embedded application widget instantiate the application itself and set the application window of the application to correspond to the dimensions and position of the embedded application widget within the wall so that the user is actually interacting directly with the executing application, although it appears as an embedded application widget within the application wall. Another technique is to track the user input location on the screen/interface itself (e.g., X and Y coordinates captured based on a position of a pointing device or touch input) and also record the user input values (e.g., from a keyboard buffer), map the input locations to a particular embedded application widget that is displayed on a region of the and then pass the actual input values to the application corresponding to that embedded application widget, such as through a transparent layer executing on the client computing device.

At step 808 the client computing device can transmit application output from the linked application to the server. For example, if a user access a shared library that is stored on the server through their client application and makes changes to the library (e.g., to modify, copy, or delete files), those changes can be propagated to the server. In the scenario where a particular user is acting as a presenter the application output is also initially routed to the server so that it can be used to update the other client computing devices.

At step 898 the server can propagate the application output to the other clients. As discussed above, when a local user is acting as a presenter, the application output is routed to other clients through the server, in order to synchronize their virtual conference room instances with the presenter virtual conference room. Even when a local user is not acting as presenter, it may be necessary to update applications on other clients based on actions performed by a user on the local client and the corresponding application output. These updates are also propagated to other clients. For example, in the scenario where a user modifies a shared library, it may be necessary to then synchronize a local library stored on each client with the shared library on the server.

As shown in FIG. 8, at step 810, the application output from the linked application can be transmitted to to a third-party server associated with the linked application. This can be performed for third party applications in which some functionality or data is hosted on a third party server (e.g., Google cloud, Dropbox, etc.). The application output of the linked application can also include information configured to be sent to the third party server, such as authentication information, and this can be transmitted at step 810. Note that steps 808-809 and 810 can be performed concurrently, as different application output can be routed to the server/other clients and to the third party server.

Figure 9A:
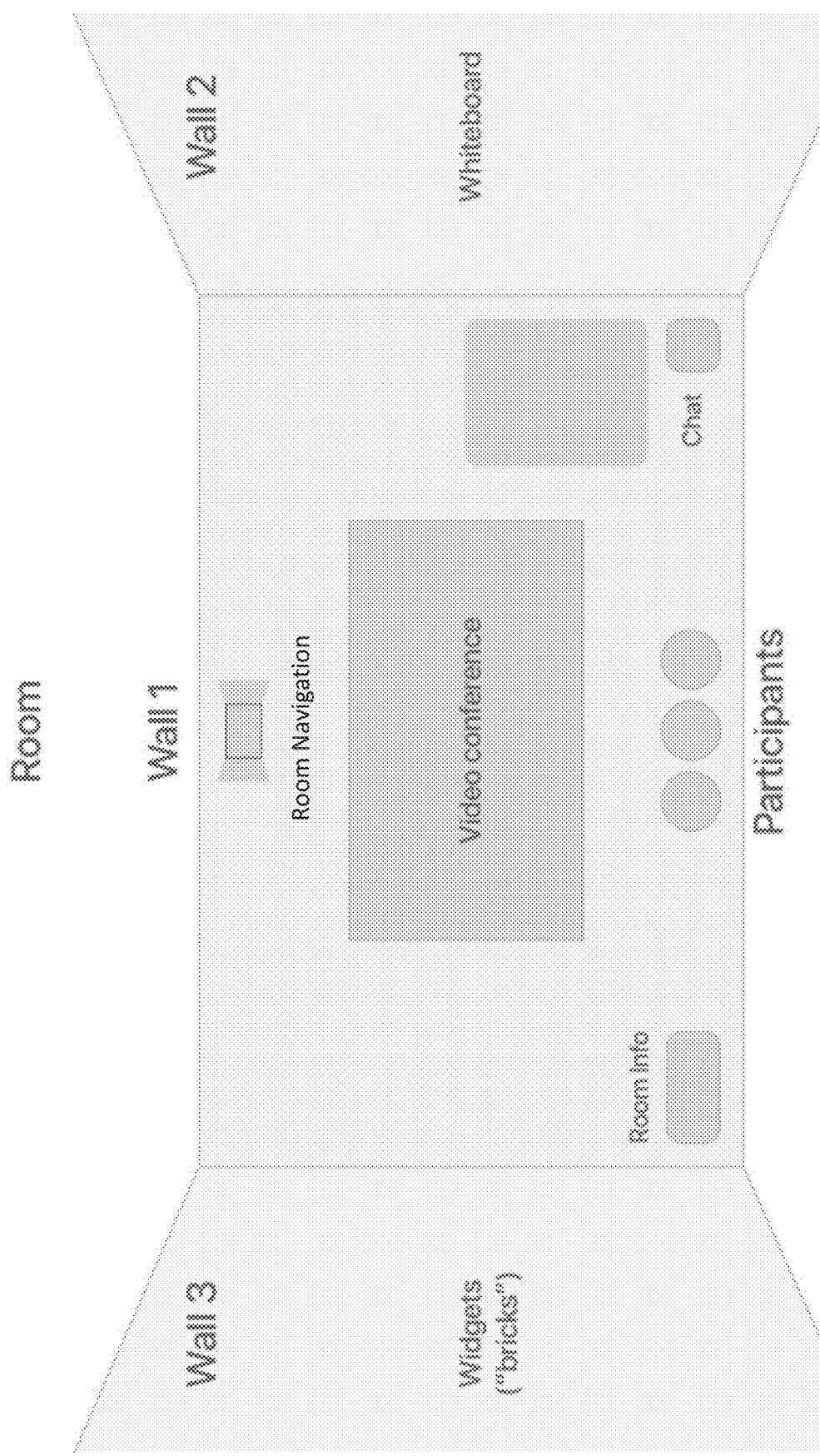
FIGS. 9A-9C illustrate examples of the three-dimensional representation of the virtual conference room that is rendered on the client computing devices according to an exemplary embodiment.
Figure 9B:
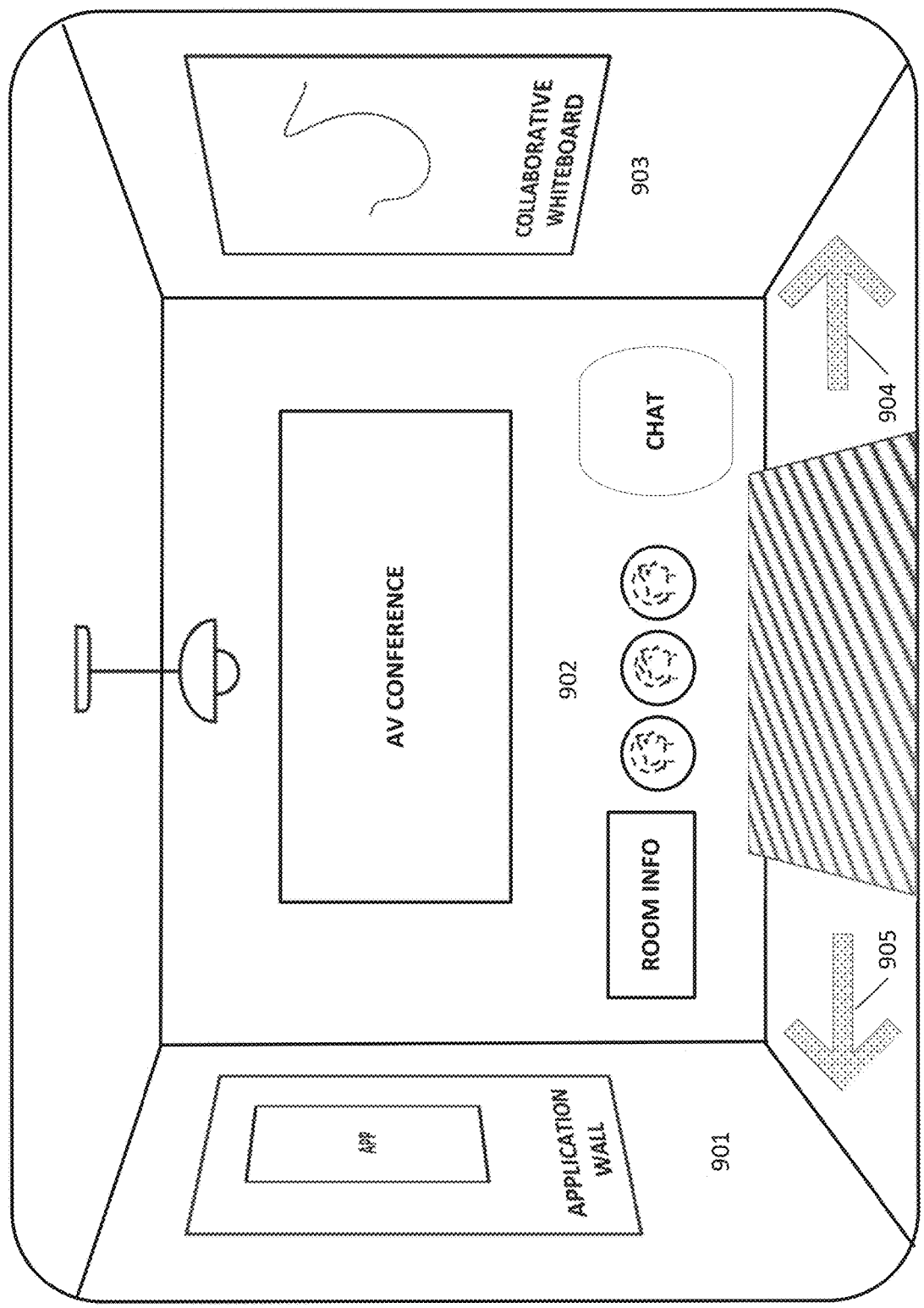
Figure 9C:
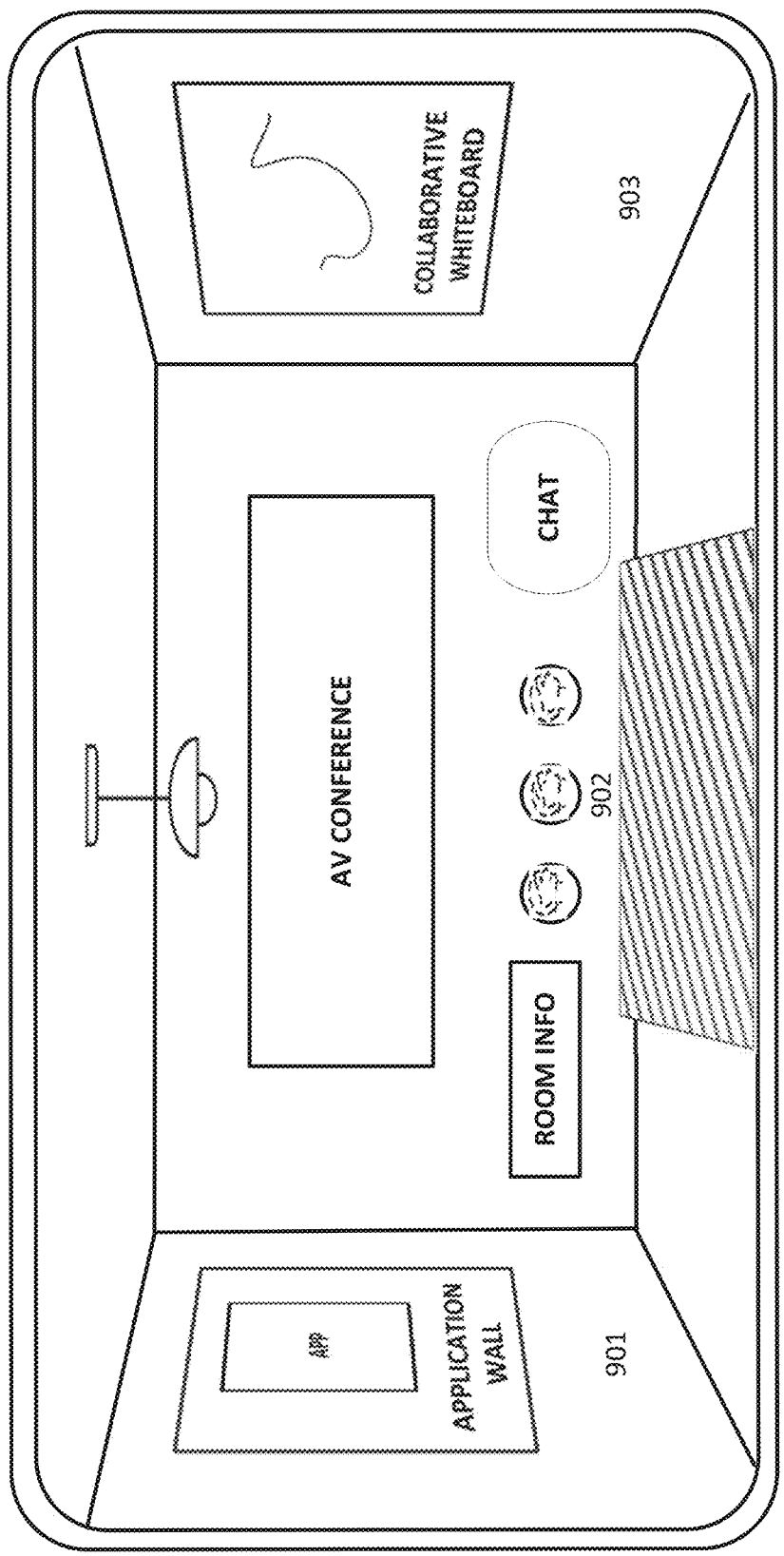

FIGS. 9A-9C illustrate examples of the three-dimensional representation of the virtual conference room that is rendered on the client computing devices according to an exemplary embodiment.

FIG. 9A illustrates a simplified view of the three-dimensional representation of the virtual conference room to show the various interface features. As shown in the figure, the virtual conference room has three walls, including the collaboration wall, the communication wall, and the application wall.

From the backend perspective, each wall is a separate entity or instance and can be stored differently for every room at the database level. Walls include information about their components, graphics, format, type, content and/or any other associated data. Each room can also be associated with a plurality of walls.

For example, Room "A" can be associated with a list of walls: wall 1, wall 2 and wall 3. There is a one-to-many reference.

Wall 1 can be of type "Communication" and stores the Videoconference ID, a reference to the chat ID, room background settings/customization, etc. This data is shared among the room members (it is the same for everyone).

Wall 2 can be of type "Collaboration" and stores the reference to the whiteboard session. This data is shared among the room members (it is the same for everyone).

Wall 3 can be of type "Application" and stores the references to the applications (bricks). This data is partially shared among the room members (e.g. the storage of common files such as meeting recaps) and partially user-specific (e.g. the access to an external federated app instance such as Google Drive).

The application wall can be initially rendered with a proprietary UI that is used for navigating among the applications. When a particular application is entered or selected, it can then be rendered either with a proprietary user interface (UI) (in case of the default apps, such as the common files storage) or with an iframe or embedded window (in case of integrated third-party apps).

Applications that are shown in the application wall can be hosted and executing on a local or remote device, such as one of the client devices (e.g., a device of the one of the participants to the collaboration session) or the server. When rendering these applications with a proprietary UI within the app wall, the applications can communicate with backend servers hosting the collaboration session (such as with a REST API web application), which then render the remote application within the application wall and propagate the rendering to all computing devices connected to the collaboration session. As discussed earlier, rendering can also be performed locally.

When rendering applications with an iframe or embedded window, applications can execute on client machines and communicate with third-party application servers (e.g., an iframe with a YouTube player or a Trello board). The interface of these applications within the application wall is linked to its native execution on a third party server.

Some applications corresponding to embedded application widgets in the application wall can require authentication. Using the example of a google document, the following steps can be peformed. At step 1 a room admin sets a google doc link as a new widget. At step 2 a room member accesses the widget for the first time and logs in (authenticates). At step 3 the google doc is made available. At step 4 the authentication persists the next time the member accesses the widget.

Some applications within the application wall can be shared between participants and can be presented in the same way to all participants. For example, a common file storage can be used for meeting recaps. Some applications can be shared but authenticated differently for each member, such as, for example, a Trello board. Some applications can be different for every member, such as a personal storage folder (e.g., Dropbox).

Applications can be managed by a Room Manager/Owner such that every room member can see the same list of applications. However, even when every room member sees the same list of application, they can differ in terms of authentication. For example, member A and member B can both see a Trello board app, but member A will login with his own credentials and will see his own interface, and the same will happen for member B. Besides the applications managed by the Room Owner, room members can privately add and browse their personal storage apps such as Google Drive, Dropbox or OneDrive, in order to easily import files.

Although multiple walls are shown in FIGS. 9A-9C, it is understood that a single wall can be presented within the interface at one time. Regardless of how many walls are utilized in the multi-wall interface, a single wall is always centered in the interface, referred to herein as the "focus wall." The focus wall can be presented in full screen, such that the other walls are not visible within the user interface. Alternatively, the focus wall can be configured to fill a majority, but not the entirety, of the user interface, with the remaining space being used to present controls to access other walls and/or navigate between the walls or portions or representations of the other walls.

FIG. 9A also illustrates controls (labeled "Room Navigation" near the top of the interface) for transitioning between walls according to an exemplary embodiment. As shown in FIG. 9A, a navigation/preview selector can be displayed in the center of the wall interface and can show a miniaturized version of the walls, along with an indication of the currently selected wall. A user can utilize the navigation/preview selector to switch from a currently selected wall to a different wall, such as through a touch input/gesture/or a click of a pointing device.

Another option for switching between walls is gesture input. For example, the user can swipe left to move to the next wall on the right or swipe right to move to the next wall on the left. The interface can be configured to detect the swipe gesture on some portion or zone of the interface or on the entire interface.

A third option for switching between walls can be click/touch enabled side regions. In this case, a user can click or touch a side of the interface to bring up a navigation interface or other control that allows the user to switch walls or navigate to the next/previous walls. Two side regions can be utilized, one on the left side and one on the right side, to scroll either left or right. In implementations with greater numbers of walls, top and bottom regions can also be utilized, for example, to scroll to a "ceiling" or a "floor" wall.

Each participant in the collaboration session can independently view which wall they are facing (i.e., their focus wall). For example, one participant can be viewing the whiteboard wall, another can be viewing the communication wall, and another can be viewing the application wall, at the same time. Alternatively, one participant such as an administrator or host of the meeting, can act as a presenter and control the view and the focus wall for all participants. Optionally, an administrator can toggle a "presenter mode" on and off, so that participants are free to choose their own focus wall (when presenter mode is off) or participants are locked to the presenter's view and actions (when presenter mode is on).

The room owner can optionally activate presenter mode and has the ability to use it to control the collaboration session and can also assign it to another room member. The presenter then drives and decides not only on which wall the current focus is, but also which application is currently open and visible for every other room member (when the focus is on the application wall). As explained above, when presenter mode is not active, users can have the freedom to focus on any of the walls or any of the applications on the application wall.

FIG. 9B illustrates another example of the three-dimensional representation of the virtual conference room according to an exemplary embodiment. FIG. 9B includes similar features as shown in FIG. 9A, including a collaboration wall 903, a communication wall 902, and an application wall 901. As shown in FIG. 9B, the communication wall is currently in focus. This figure also illustrates other aspects of the virtual conference room, including the objects of the communication wall, environmental graphical element design to increase immersion (such as the light fixture on the ceiling and the conference table, shown in shading). FIG. 9B additionally illustrates the controls for switching the focus wall as two arrows, 905 and 904, but any of the control elements discussed above can also be utilized.

FIG. 9C illustrates another example of the three-dimensional representation of the virtual conference room on a mobile device according to an exemplary embodiment. FIG. 9C is similar to FIG. 9B, but the aspect ratio has been adjusted to fit the screen shape of a mobile device. Additionally, control arrows 904 and 905 are omitted, as the user can utilize touch and swipe gestures to switch the focus wall.

FIG. 10A illustrates a system chart of the computing devices that can be used in the method for virtual conferencing with embedded collaboration tools according to an exemplary embodiment. The system includes a collaboration server 100, one or more client computing devices 1001, and one or more third party servers 1002.

Collaboration server 1000 can store the virtual conference room 1000A, shared applications 1000B, shared storage 1000C, user permissions/authorizations 1000D, and meeting settings or parameters 1000E. The server 1000 can also store a virtual lobby, discussed in greater detail below.

Each of the client computing devices 1001 can store virtual conference room rendering software 1001A, user parameters 1001B, user applications 1001C, and local storage 1001D. The client computing devices can optionally also store a transparent layer and associated components to enable some of the functionality described earlier.

Each of the third party servers 1002 can store third party applications 1002A and/or user profiles, user data, or user storage space 1002B. As explained previously, the third party server can also be in communication with the client computing devices 1001 during the virtual conferencing meeting.

Figure 10B:
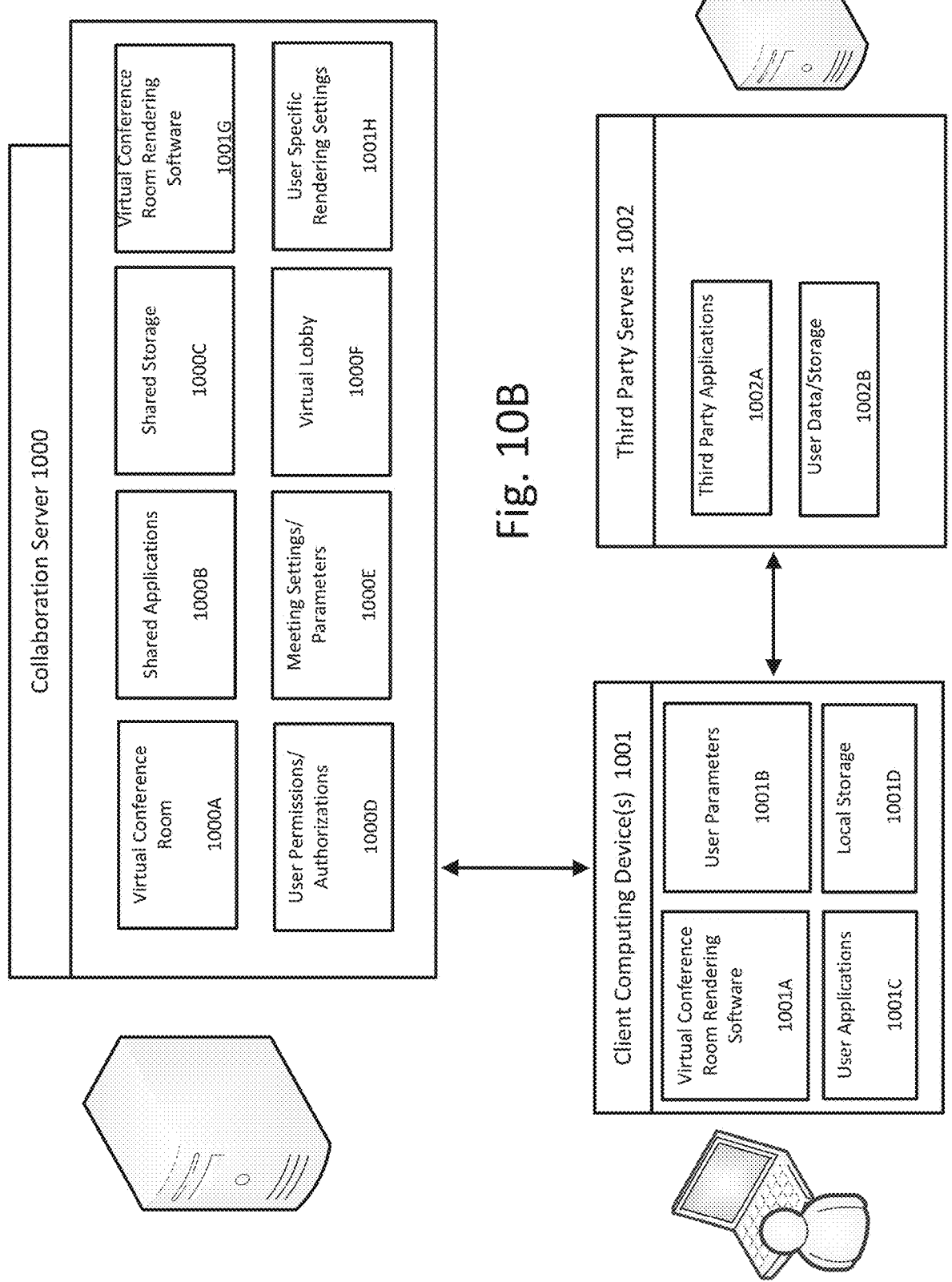

FIG. 10B illustrates another system chart of the computing devices that can be used in the method for virtual conferencing with embedded collaboration tools according to an exemplary embodiment. The collaboration server 100, client computing devices 1001, and third party servers 1002 of FIG. 10B are similar to the components shown in FIG. 10A.

One of the differences between the system chart shown in FIG. 10A and the one shown in FIG. 10B is that the collaboration server 1000 in FIG. 10B includes server-side virtual conference room rendering software 1001G, as well as user specific rendering settings 1001H. user specific rendering settings 1001H store the parameters used to instantiate and customize an instance of the virtual conference room for each user/client computing device.

The user specific rendering settings 1001H are used in conjunction with the server-side virtual conference room rendering software 1001G to determine the format and generate the rendering of the virtual conference room for each of the client computing devices 1001. The generated renderings can then be sent to the various client computing devices 1001, which use their own client-side virtual conference room rendering software 1001A to actually display the customized virtual conference room in the user interface of the client computing devices 1001.

In this variation, since the rendering of each instance of the virtual conference room is performed server-side, the client-side virtual conference room rendering software 1001A is much more basic/generalized, and can be any kind of software which is configured to receive the rendering information and use it to display the virtual conference room. This can be, for example, an application stub, a browser, or a browser extension.

Figure 11:
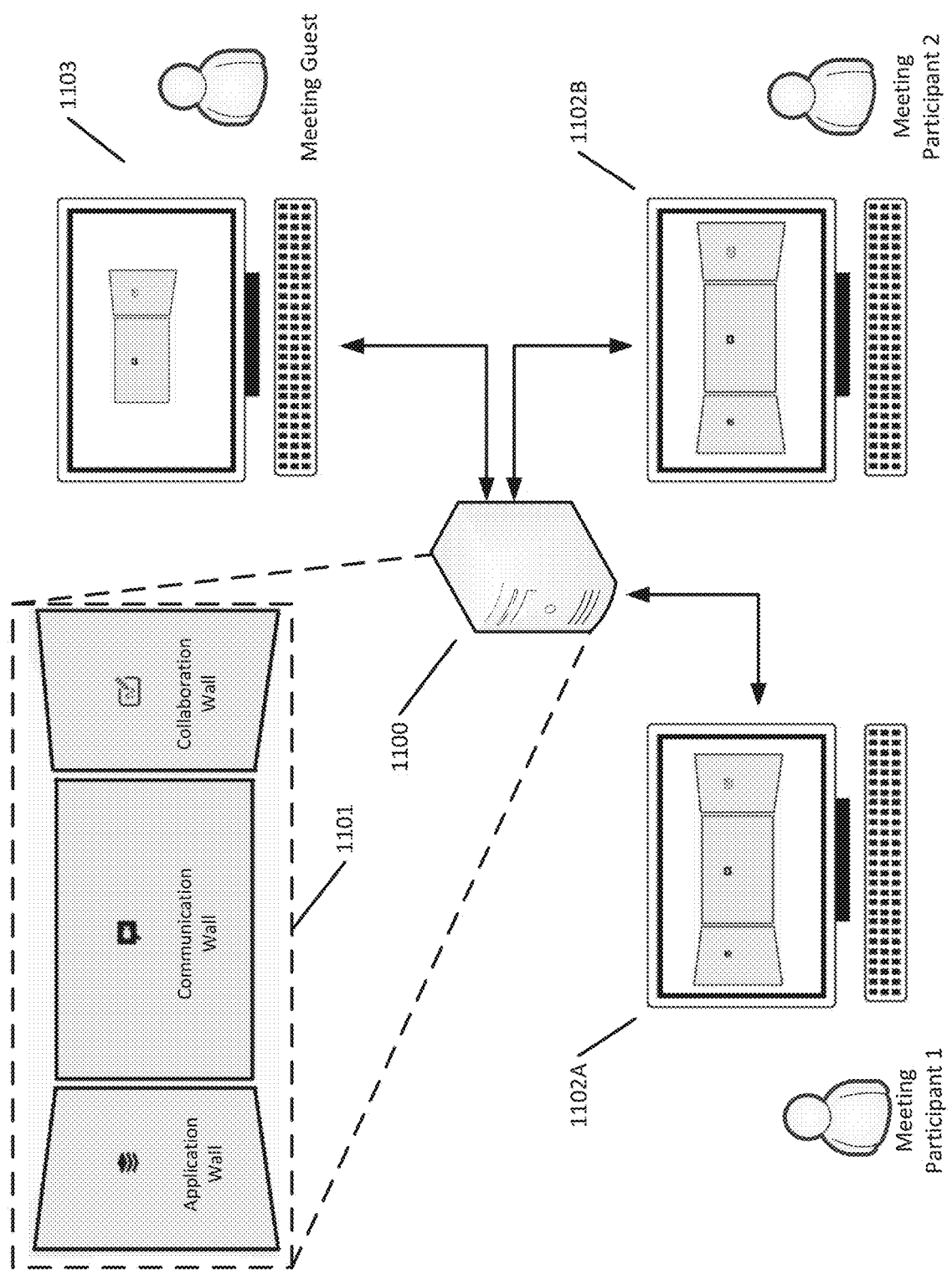
FIG. 11 illustrates the process for propagating customized versions of the virtual conference room to participants according to an exemplary embodiment.

FIG. 11 illustrates the process for propagating customized versions of the virtual conference room to participants according to an exemplary embodiment. As shown in FIG. 11, the server 1100 hosts the virtual conference room 1101, which has three walls including the collaboration wall, the communication wall, and the application wall.

Computing devices 1102A and 1102B correspond to meeting participants that are members of the collaboration service or otherwise have the required user parameters/authorization level to view and interact with the application wall. Computing device 1103, on the other hand, corresponds to a meeting guest or other type of user who does not have the required user parameters/authorization level to view and interact with the application wall. As shown in FIG. 11, the virtual conference room is rendered with the application wall on computing devices 1102A and 1102B but rendered without the application wall on computing device 1103.

Figure 12:
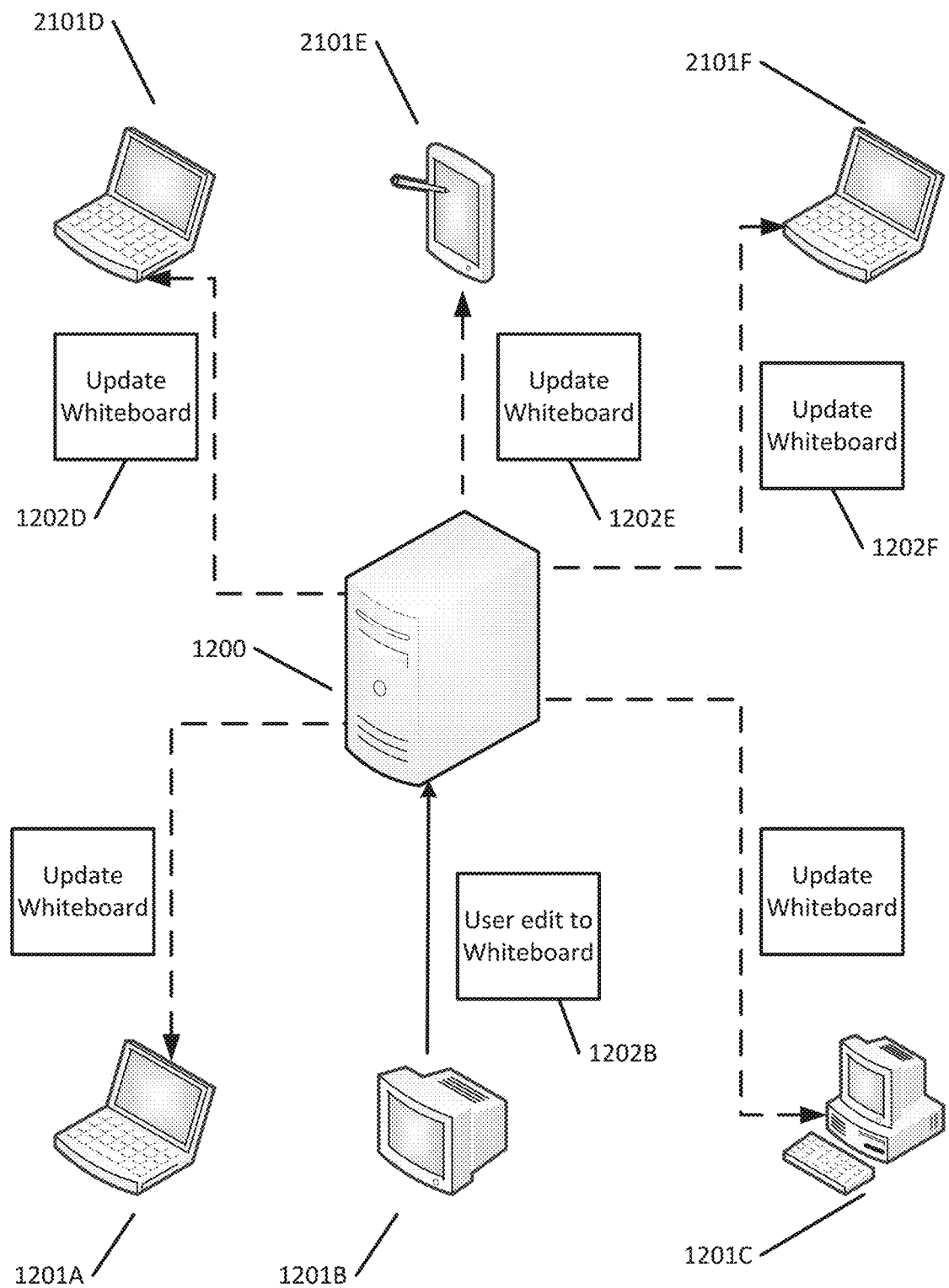
FIG. 12 illustrates the network architecture and the process for propagating edits to the whiteboard portion of the collaboration wall according to an exemplary embodiment.

FIG. 12 illustrates the network architecture and the process for propagating edits to the whiteboard portion of the collaboration wall according to an exemplary embodiment. As shown in FIG. 12, if a user at computing device 1201B makes an edit or an alteration to the whiteboard or other portion of the collaboration wall/workspace, this edit or alteration 1202B is sent to the server 1200, where it is used to update the hosted version of the whiteboard. The edit or alteration is then propagated as updates 1202A, 1202C, 1202D, 1202E, and 1202F by the server 1200 to the other connected computing devices 1201A, 1201C, 1201D, 1201E, and 1201F.

Figure 13:
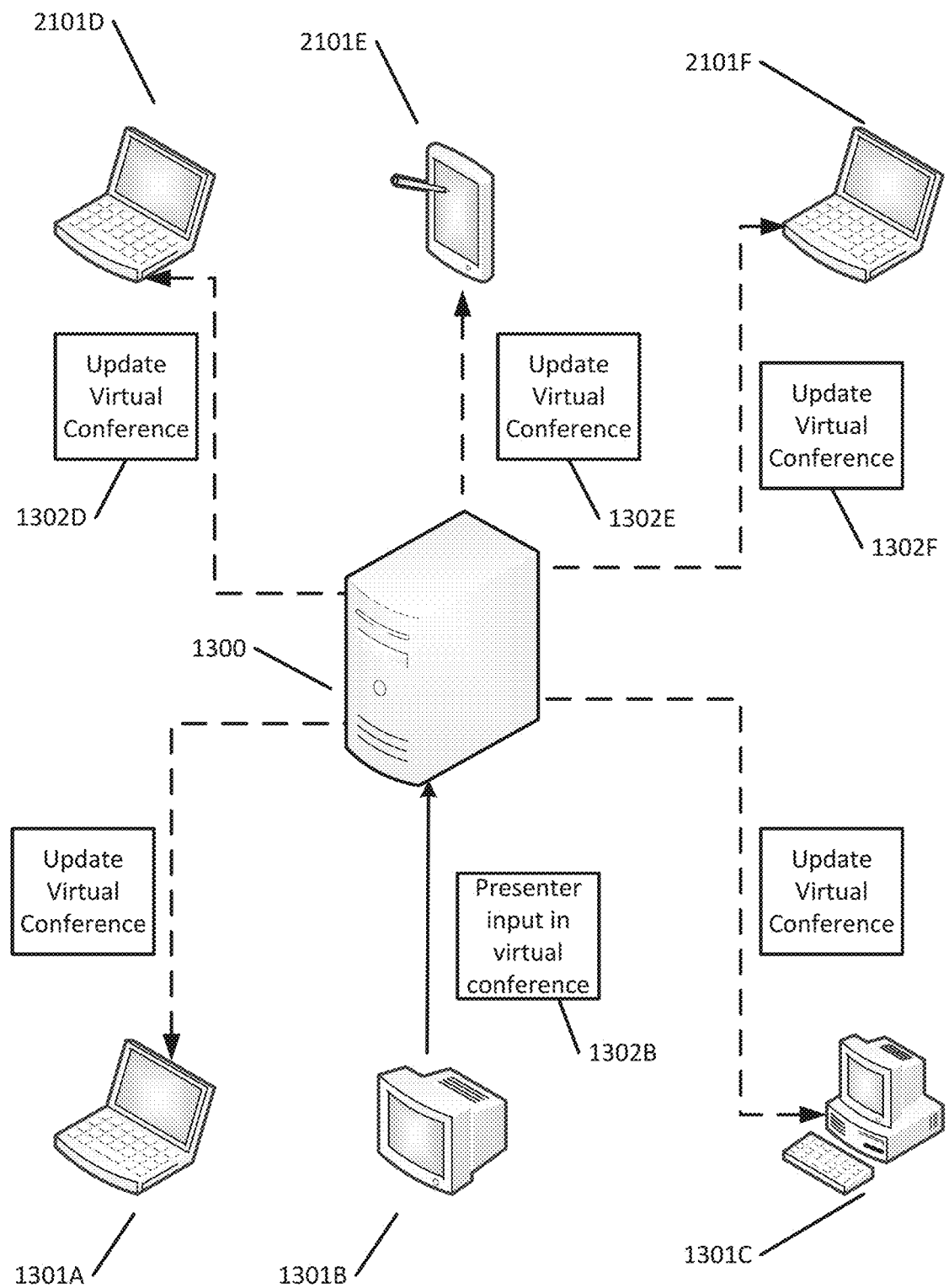
FIG. 13 illustrates the network architecture and the process for propagating inputs by a presenter within the virtual conference according to an exemplary embodiment.

FIG. 13 illustrates the network architecture and the process for propagating inputs by a presenter within the virtual conference according to an exemplary embodiment. As shown in FIG. 13, if a presenter at computing device 1301B makes an input to the virtual conference, this input 1302B is sent to the server 1300, where it is used to update the hosted version of the virtual conference. The updated virtual conference is then propagated as updates 1302A, 1302C, 1302D, 1302E, and 1302F by the server 1300 to the other connected computing devices 1301A, 1301C, 1301D, 1301E, and 1301F.

Figure 14:
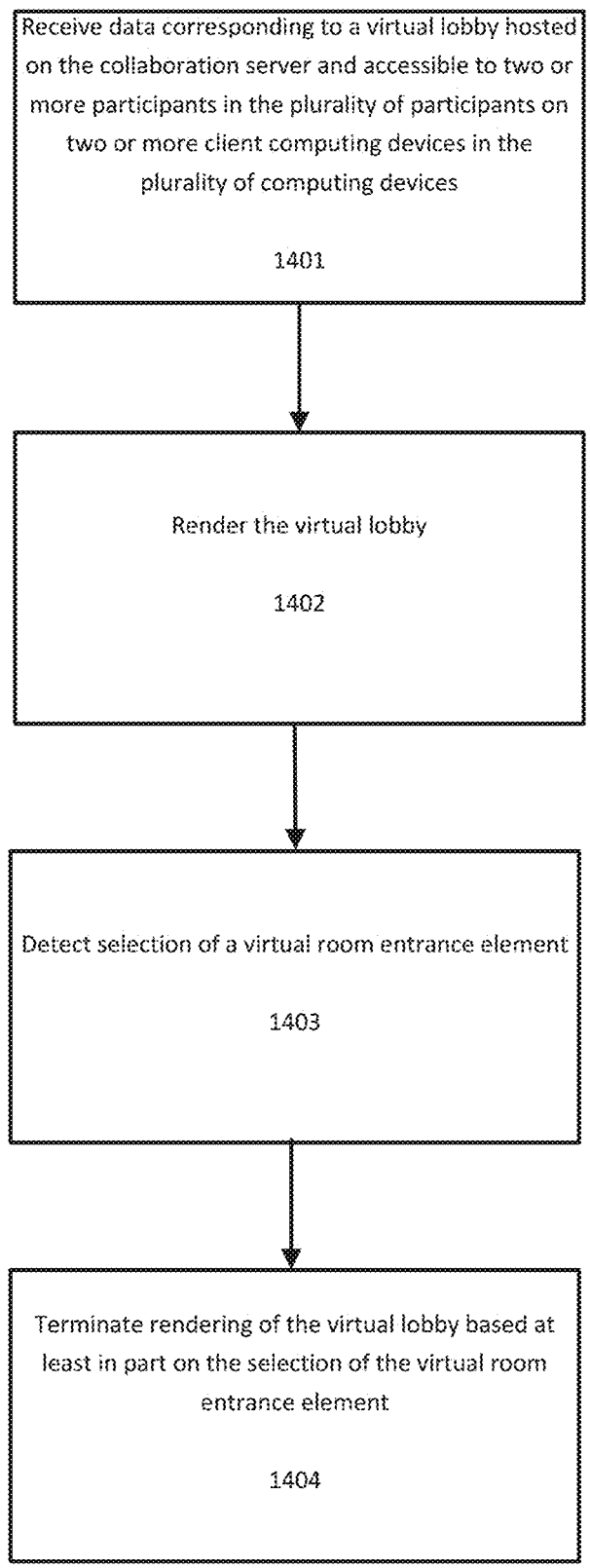
FIG. 14 illustrates a flowchart for implementing a lobby stage of a meeting prior to the virtual conference room according to an exemplary embodiment.

FIG. 14 illustrates a flowchart for implementing a lobby stage of a meeting prior to the virtual conference room according to an exemplary embodiment. The steps shown in FIG. 14 can be performed prior to any of the steps shown in FIG. 1, including the step of receiving data corresponding to a virtual conference room hosted on a collaboration server and accessible to a plurality of participants on a plurality of client computing devices.

At step 1401 data corresponding to a virtual lobby hosted on the collaboration server is received. The virtual lobby is accessible to two or more participants in the plurality of participants on two or more client computing devices in the plurality of computing devices. The virtual lobby can be the first environment rendered when a user enters a meeting (such as by clicking a link, navigating to a particular web page, or selecting a particular meeting in an application. The virtual lobby can also be skipped for certain classes of users, such as guests or others having insufficient privileges or permissions.

The virtual lobby includes a chat interface accessible to the two or more participants, the chat interface being configured receive and display textual communications between the two or more participants. This chat can be used to communicate with other participants prior to the actual meeting and, optionally, after the meeting.

The virtual lobby also includes a file sharing application interface accessible to the two or more participants, the file sharing application being configured to share one or more files received from a participant with other participants. This allows sharing of files prior to and after the meeting. The file sharing application can be configured to transmit shared files to a shared folder that is accessible to the two or more participants. The shared files can also be sent to a folder or location accessible to the participants of the meeting and accessed from within the virtual conference room.

The virtually lobby additionally includes a file editing application interface accessible to the two or more participants, the file editing application being configured to permit the two or more participants to concurrently edit a shared file. The file editing application interface opens a file editing application for concurrent use by two or more participants. This allows participants to finalize documents and presentations prior to entering the virtual conference room, or to update documents after a meeting.

The virtual lobby can optionally also include an audio-visual communication interface configured to display an audio stream, visual stream, or audiovisual stream of the two or more participants in the virtual lobby. This allows lobby participants to communicate directly prior to the actual virtual conference.

Finally, the virtual lobby includes a virtual conference room entrance element. This is a selectable user interface element that exits the lobby and virtually transports the participant to the virtual conference room.

Figure 15:
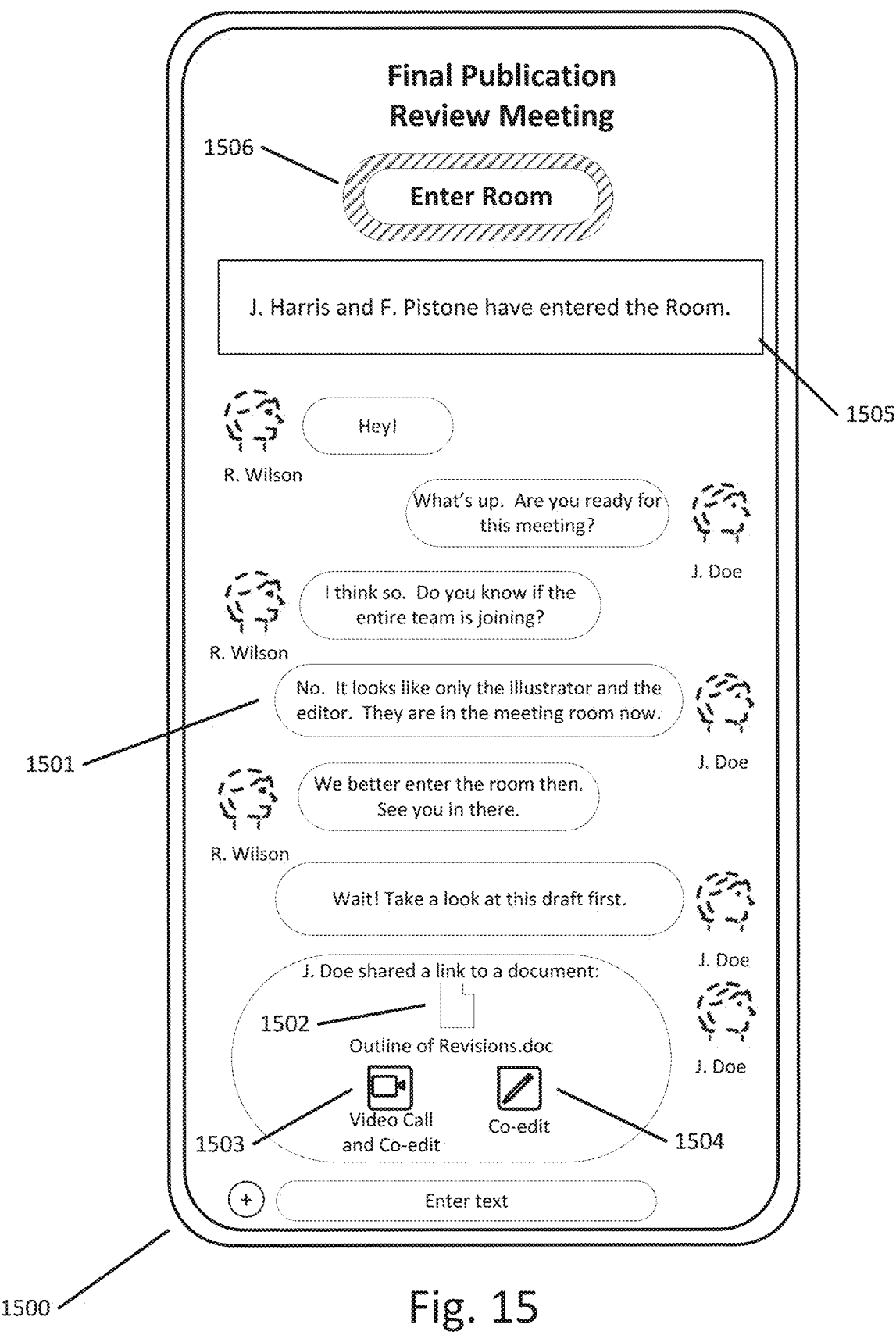
FIG. 15 illustrates a virtual lobby interface according to an exemplary embodiment

At step 1402 the virtual lobby is rendered on a user interfaces of a client computing device. An example of the virtual lobby is shown in FIG. 15, but can take any form which includes the above-mentioned virtual lobby elements. The virtual lobby can be rendered on the user interface of the client computing device based at least in part on one or more user parameters of the user of the client computing device. For example, if the user does not have sufficient authorization or access privileges, then the lobby stage can be skipped entirely. The user parameters used to determine whether to render the lobby or whether to not render the lobby and skip the lobby stage can be any of the parameters previously discussed, including user member status, user sub group, user authorization level, user device, user affiliation, presenter status, etc.

At step 1403 a selection of the virtual conference room entrance element is detected. This corresponds to a participant deciding to exit the virtual lobby and selecting the virtual conference room entrance element.

At step 1404 rendering of the virtual lobby on the user interface of the client computing device is terminated based at least in part on the selection of the virtual conference room entrance element. After step 1404, the process can proceed to step 101 of FIG. 1, discussed earlier.

FIG. 15 illustrates a virtual lobby interface according to an exemplary embodiment. The interface 1500 includes a chat interface 1501, a file sharing application interface 1502, a file editing application interface 1503 and 1504, and an audiovisual communication interface 1503. The interface 1500 also includes a status interface 1505 letting participants in the lobby know which participants have entered the virtual conference room and a virtual conference room entrance element 1506 that lobby participants can select to exit the virtual lobby and enter the virtual conference room.

Although not shown, the virtual lobby can also include an interface to send meeting invites to other users.

In addition to the disclosed virtual conference room and virtual lobby, Applicant has discovered a novel collaboration system, method, and computer readable medium that implements multi-participant collaboration sessions over three separate phases, including a setup phase, a lobby phase, and a room phase.

Figure 16:
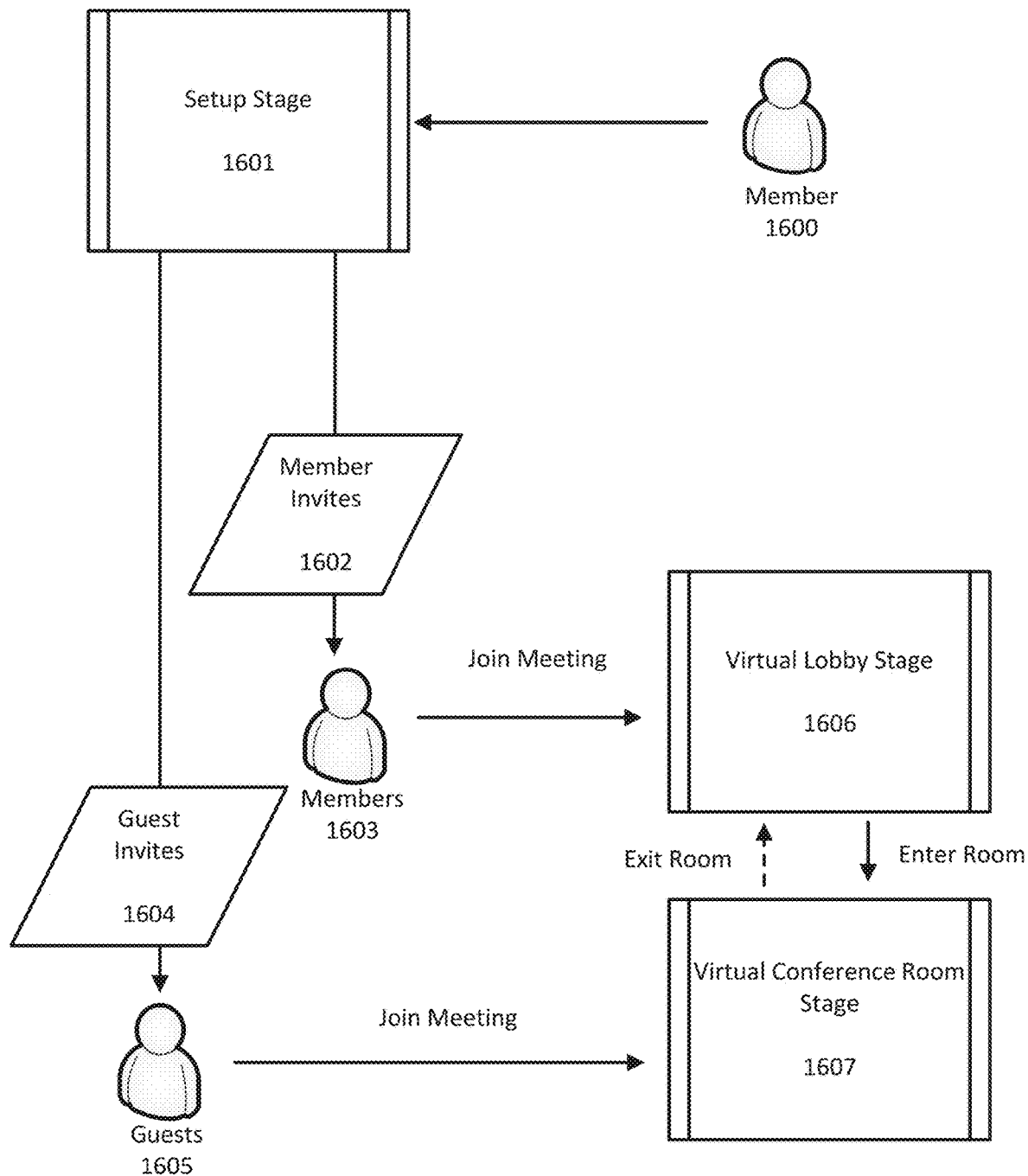
FIG. 16 illustrates a process flow of a multi-phase/multi-stage collaboration method according to an exemplary embodiment.

FIG. 16 illustrates a process flow of a multi-phase/multi-stage collaboration method according to an exemplary embodiment. In the setup stage 1601, the selection and invitation of members occurs. The setup stage is initiated by a member 1600 of the collaboration service.

The invitation of the members/users can confers a unique badge that can be sent electronically. There are multiple types of invitations, include guest invitations and member invitations. Optionally, the member invitation can be personal and persistent (i.e., does not expire), whereas the guest invitation can be temporary (expires).

The purpose of the setup stage is to create a room and invite members. The setup stage can include one-tap invitation to members, one-tap invitation to new users via email, and one-tap Guest invitation (for Room onetime access only) via share link through any desired communication channel.

As shown in FIG. 16, member invites 1602 are then sent to invited members 1603 and guest invites 1604 are sent to guests. "Members" in this figure refers to any participants who have the required user parameters/access privileges/authorization to access the lobby, whereas "Guests" refers to all others who do not have the required user parameters/access privileges/authorization to access the lobby.

The guest invites 1604 are used by the guests 1605 to directly enter the virtual conference room 1607, described throughout this application. The member invites 1602 are used by members 1603 to join the virtual lobby 1606, described above. Optionally, members 1603 can use other routes to enter the meeting once they have been put on the invite list, such as an app or specific meeting web address.

Acceptance of an invitation, for example through electronic confirmation (link or app) or through the insertion of temporary credentials, allows access to the virtual lobby interface and the virtual lobby stage 1606. The lobby allows members to interact with a flow of persistent information (e.g. chat, content sharing, participation in surveys and competitions, . . . ) occurring within the lobby. The lobby includes a number of tools, referred to as pre-room tools. The lobby stage can also be entered after the meeting, such as by selecting an icon to return to the lobby.

The purpose of the lobby stage is for pre-meeting collaboration and post-meeting follow up. As described earlier, the virtual lobby includes features such as real-time chat communication, real-time A/V communication, real-time chat file sharing, including documents, images, videos, and links, and a feature that allows users to send out invitations from the lobby to guests or other members.

The lobby also includes a number of prodromal features that link data and metadata between the lobby and other stages of the meeting, including:

Shared files can start a co-editing session. A user can invite another user in the lobby to co-edit a file and the co-editing session can begin from the lobby.

Shared filed can be sent to the Virtual Conference Room when considered useful to the meeting. Files that are determined to be relevant or useful to the meeting can be "sent to the Room" and stored in a special folder that is accessible to participants when in the room. This allows members to plan out the stages of the meeting and the supporting materials and consolidate all necessary files ahead of time.

Meeting planning and meeting recaps are collected in the Lobby. Chat conversations in the lobby, both before and after the meeting can be collected and automatically annotated with the relevant metadata indicating whether the conversations were pre-meeting planning or post-meeting recaps/discussion. This can be done in a number of ways and can include, for example, tracking when users enter the room, tracking when users leave the room, tracking the meeting start and end times, etc.

Room check-in and check-out log of every Room member. The presence or absence of members in the lobby and room can be tracked and displayed to other users.

The chat transcript, chat communications, and any file editing can also be linked to the room so that the same communication channels are utilized in the room as the chat. This allows for conversation between members to transition seamlessly from the lobby to the meeting and back to the lobby as participants move through different stages of the meeting.

As explained earlier, the virtual lobby can also have associated permissions and privileges data structures that determine who has access to the lobby. For example, not all meeting participants may be granted access to the lobby. Certain guest users or other members can optionally be excluded from the lobby. For those members or guests, the meeting includes only a room phase. The guests or members excluded from the lobby can optionally have other restrictions, such as no ability to chat, so that they cannot view or access any chat that is occurring in the lobby. Alternatively, guests or members excluded from the lobby can have their own chat communication channel separate from the members who can access the lobby. In another variation, permissions and the presence of members in the lobby or the room can be used to trigger whether chat communications from members having lobby privileges are viewable to members in the room who do not have lobby privileges. For example, any chat by a member who is in the lobby can automatically be filtered from the chat log available to a guest in the room, but any chat by that same member when they are in the room can be unfiltered. Many different combinations of permissions and filtering of communication are possible, and these examples are not intended to be limiting.

The virtual conference room stage 1607 begins upon taking an entrance action within the lobby stage 1606 (such as by selecting the appropriate icon within the lobby interface) or, for users that cannot access the lobby, by joining the meeting (from the meeting invite or otherwise). The virtual conference room is described in detail throughout this application. Some of the disclosed features are summarized below, with additional description of functionality and features:

Chat functionality within a meeting participant section that shows each participant as an avatar/icon within the context of a meeting room or other "virtual" space. This component provides the feel of an in-person conference room and intuitively implements additional person-to-person features, including one-to-one chat between participants, transfer of documents or files between persons, or other interactions. For example, user-to-user chat can be initiated by clicking on a participant icon of a user. Files can also be directly passed between users (and client computing devices) by dragging a file to a user icon. In this case, the file is transferred via web socket connection to the server and routed to the appropriate destination client. This component can also display attributes or status information about participants (e.g., who is the presenter).

A whiteboard and related tools section. The whiteboard is presented within the context of the conference room, so that it appears as part of the "room" rather than just as simply a user interface feature. This can be accomplished through use of perspective, certain graphics around the whiteboard, or other visual techniques. The whiteboard tools (e.g., edit, crop, paste, draw, navigate pages, etc.) can also be also be integrated into this section. The whiteboard permits file sharing, presentation and annotation on the whiteboard itself An environment section. This includes all remaining parts of the interface and is designed to show the rest of the virtual meeting room. The environment section can enhance the ambience and immersion of the room and also can include additional interactive functionality and features that the user can click/touch/interact with. The environment can include, for example, walls, switches, ceiling, floor, windows, etc.

User-environment features. When users join the meeting their icon appears at the table. The "lights" in the room or the whiteboard can be "off" until the meeting officially begins or certain number of participants arrive. This can be implemented with graphical techniques like changing the color palette, switching out certain pictures or images, etc. If the virtual conference room is rendered as a three-dimensional rendering using a graphics library, these techniques can be implemented by adjusting the lighting parameters.

User identification features—the speaker or presenter can be denoted using a certain outline or symbol. Other information about a user or their role can be shown in the graphics/icons.

Expansion of the whiteboard to take up the entire screen—a user can select an icon or perform a gesture, such as an expanding gesture, to transition from a view in which they can see the icons for other participants and the whiteboard to a view in which the whiteboard takes up the entire screen. The opposite icon or gesture (such as a pinch touch gesture) can be used to return to the first interface.

Asking questions without interruption. For example, if User 1 is presenting and User 2 has a question, they can select an option to "raise their hand" and the symbol/icon/avatar for User 2 can be modified to show indicate this. User 1 can then call on them at the appropriate time. This is an improvement to the current collaboration software where User 2 would just have to interrupt User 1.

User polling functionality can include taking a vote on issues by raising hands, moving icons/avatars, and/or modifying graphical attributes of icons (e.g., red or green, dragging to yes and no columns, etc.).

The whiteboard can be customized to different users—for example, the color of writing on the whiteboard can be color coded to participant. Certain users can have different permissions.

Environment generation features—the generated environment can be customized by the user or meeting creator or generated automatically based on one or more variables, such as the number of participants, topic, etc. This includes the table, ambient features (such as the ceiling, walls, background, etc.). This can be configured by the user in preferences.

The room also includes prodromal (i.e., relating to the other phases) features, such as the ability to access files "sent to the room" by clicking on an icon within the room interface, automatic updating of the room files with files that are or were co-edited by members in the lobby, access to chat transcript from the lobby for members or others with lobby privileges, etc.

Figure 17:
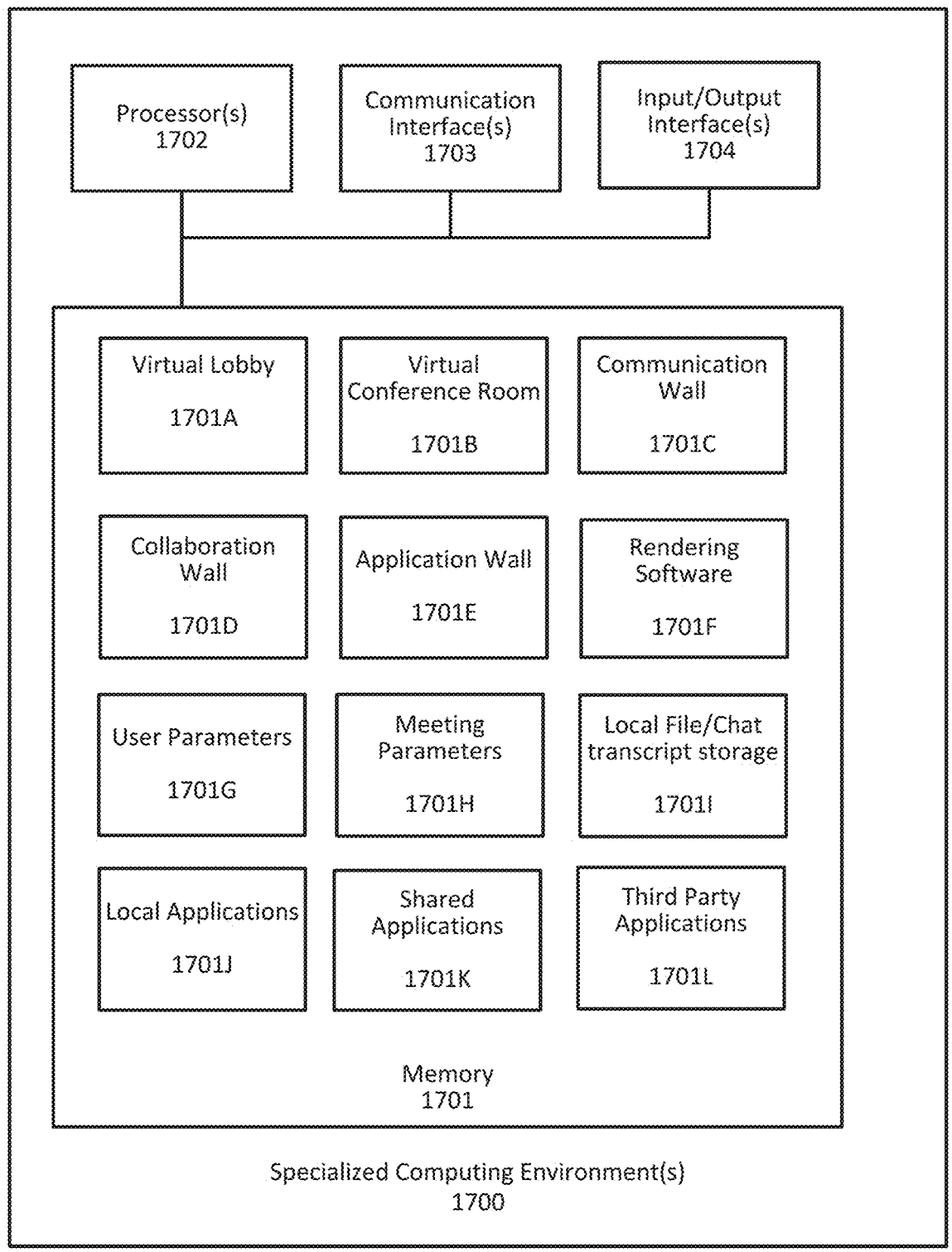
FIG. 17 illustrates the components of the specialized computing environment 1700 configured to perform the specialized processes described herein according to an exemplary embodiment.

FIG. 17 illustrates the components of the specialized computing environment 1700 configured to perform the specialized processes described herein. Specialized computing environment 1700 is a computing device that includes a memory 1701 that is a non-transitory computer-readable medium and can be volatile memory (e.g., registers, cache, RAM), non-volatile memory (e.g., ROM, EEPROM, flash memory, etc.), or some combination of the two. The specialized computing environment can correspond to a client computing device, a collaboration server, or some combination of the two.

As shown in FIG. 17, memory 1701 can include virtual lobby data structures 1701A, virtual conference room data structures 1701B, communication wall objects/sub-objects 1701C, collaboration wall objects/sub-objects 1701D, application wall objects/sub-objects 1701E, rendering software 1701F, user parameters 1701G, meeting parameters 1701H, local files/chat transcript storage 1701I, local applications 1701J, shared applications 1701K, and third party applications 1701L. The memory 1701 can additionally include storage for files, user/member settings, software for performing the above-described functionality, apps, interfaces, walls, whiteboards, streaming objects and audiovisual streams, networking software, permissions and privileges, user interface components and functionality, room environments, chat transcripts, software for performing automatic annotation and storage of chats, etc. Each of the software components in memory 901 store specialized instructions and data structures configured to perform the corresponding functionality and techniques described herein.

All of the software stored within memory 1701 can be stored as a computer-readable instructions, that when executed by one or more processors 1702, cause the processors to perform the functionality described with respect to FIGS. 1-16.

Processor(s) 1702 execute computer-executable instructions and can be a real or virtual processors. In a multi-processing system, multiple processors or multicore processors can be used to execute computer-executable instructions to increase processing power and/or to execute certain software in parallel.

Specialized computing environment 1700 additionally includes a communication interface 1703, such as a network interface, which is used to communicate with devices, applications, or processes on a computer network or computing system, collect data from devices on a network, and implement encryption/decryption actions on network communications within the computer network or on data stored in databases of the computer network. The communication interface conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Specialized computing environment 1700 further includes input and output interfaces 904 that allow users (such as system administrators) to provide input to the system to set parameters, to edit data stored in memory 1701, or to perform other administrative functions.

An interconnection mechanism (shown as a solid line in FIG. 17), such as a bus, controller, or network interconnects the components of the specialized computing environment 900.

Input and output interfaces 1704 can be coupled to input and output devices. For example, Universal Serial Bus (USB) ports can allow for the connection of a keyboard, mouse, pen, trackball, touch screen, or game controller, a voice input device, a scanning device, a digital camera, remote control, or another device that provides input to the specialized computing environment 1700.

Specialized computing environment 1700 can additionally utilize a removable or non-removable storage, such as magnetic disks, magnetic tapes or cassettes, CD-ROMs, CD-RWs, DVDs, USB drives, or any other medium which can be used to store information and which can be accessed within the specialized computing environment 1700.

Having described and illustrated the principles of our invention with reference to the described embodiment, it will be recognized that the described embodiment can be modified in arrangement and detail without departing from such principles. It should be understood that the programs, processes, or methods described herein are not related or limited to any particular type of computing environment, unless indicated otherwise. Elements of the described embodiment shown in software may be implemented in hardware and vice versa.

It will be appreciated by those skilled in the art that changes could be made to the embodiments described above without departing from the broad inventive concept thereof. For example, the steps or order of operation of one of the above-described methods could be rearranged or occur in a different series, as understood by those skilled in the art. It is understood, therefore, that this disclosure is not limited to the particular embodiments disclosed, but it is intended to cover modifications within the spirit and scope of the present disclosure as defined by the appended claims.

The invention claimed is:

1. A method executed by a client computing device for virtual conferencing with embedded collaboration tools, the method comprising:
    receiving, by the client computing device, data corresponding to a virtual lobby hosted on a collaboration server and accessible to two or more participants in a plurality of participants on two or more client computing devices in a plurality of computing devices, the virtual lobby comprising a chat interface, a file sharing application interface, a file editing interface, and a virtual conference room entrance element;
    rendering, by the client computing device, the virtual lobby on a user interface of the client computing device;
    detecting, by the client computing device, selection of the virtual conference room entrance element;
    terminating, by the client computing device, rendering of the virtual lobby based at least in part on the selection of the virtual conference room entrance element;
    receiving, by the client computing device, data corresponding to a virtual conference room hosted on a collaboration server and accessible to the plurality of participants on the plurality of client computing devices, the virtual conference room comprising:
        a communication wall comprising an embedded audiovisual conference window configured to output an audiovisual stream of at least one participant in the plurality of participants;
        a collaboration wall comprising an embedded collaborative whiteboard, the collaborative whiteboard being configured to propagate edits by any participant to other participants in the plurality of participants; and
        an application wall comprising a plurality of embedded application widgets, wherein each embedded application widget is linked to an application configured to execute on one or more client computing devices in the plurality of client computing devices, and wherein each embedded application widget is configured to receive user input to the linked application and display application output of the linked application; and
    rendering, by the client computing device, a three-dimensional representation of at least a portion of the virtual conference room that is customized for a user of the client computing device based at least in part on one or more user parameters associated with the client computing device.

2. The method of claim 1, wherein a rendering three-dimensional representation of at least a portion of the virtual conference room that is customized for a user of the client computing device based at least in part on one or more user parameters associated with the client computing device comprises:
    determining whether the user is authorized for an application wall based at least in part on the one or more user parameters; and either:
        rendering the communication wall, the collaboration wall, and the application wall based at least in part on a determination that the user is authorized for an application wall; or
        rendering only the communication wall and the collaboration wall based at least in part on a determination that the user is not authorized for an application wall.

3. The method of claim 1, wherein rendering a three-dimensional representation of at least a portion of the virtual conference room that is customized for a user of the client computing device based at least in part on one or more user parameters associated with the client computing device comprises:
    rendering the communication wall, the collaboration wall, and the application wall;
    populating the application wall with one or more embedded application widgets corresponding to one or more applications that are selected based at least in part on the one or more user parameters associated with the client computing device.

4. The method of claim 3, further comprising:
    detecting, by the client computing device, selection of an embedded application widget in the one or more embedded application widgets;
    executing, on the client computing device, an application linked to the selected embedded application widget; and
    rendering, on the user interface of the client computing device, an application interface of the application within the selected embedded application widget, the application interface being configured to receive user input to the linked application and display application output.

5. The method of claim 4, further comprising:
transmitting, by the client computing device, application output from the linked application to the server.

6. The method of claim 5, wherein the server is configured to propagate the application output to one or more other client computing devices in the plurality of client computing devices.

7. The method of claim 4, further comprising:
transmitting, by the client computing device, application output from the linked application to a third-party server associated with the linked application.

8. The method of claim 1, wherein the plurality of embedded application widgets comprise a file sharing application widget corresponding to a file sharing application, the file sharing application being configured to store one or more files associated with each meeting conducted in the virtual conference room in a container corresponding to a meeting identifier of the meeting.

9. The method of claim 1, wherein the virtual conference room comprises a chat interface embedded in each wall and wherein a chat transcript associated with each meeting is stored in a container corresponding to a meeting identifier of the meeting.

10. The method of claim 1, wherein:
the chat interface is configured to receive and display textual communications between the two or more participants;
the file sharing application is configured to share one or more files received from a participant with other participants; and
the file editing application is configured to permit the two or more participants to concurrently edit a shared file.

11. The method of claim 10, wherein the virtual lobby further comprises an audiovisual communication interface configured to display an audiovisual stream of the two or more participants.

12. The method of claim 10, wherein the file sharing application is configured to transmit shared files to a shared folder that is accessible to the two or more participants.

13. The method of claim 10, wherein the virtual lobby is rendered on the user interface of the client computing device based at least in part on the one or more user parameters.

14. A client computing device for virtual conferencing with embedded collaboration tools, the client computing device comprising:
one or more processors; and
one or more memories operatively coupled to at least one of the one or more processors and having instructions stored thereon that, when executed by at least one of the one or more processors, cause at least one of the one or more processors to:
receive data corresponding to a virtual lobby hosted on a collaboration server and accessible to two or more participants in a plurality of participants on two or more client computing devices in a plurality of computing devices, the virtual lobby comprising a chat interface, a file sharing application interface, a file editing interface, and a virtual conference room entrance element;
render the virtual lobby on a user interface of the client computing device;
detect selection of the virtual conference room entrance element;
terminate rendering of the virtual lobby based at least in part on the selection of the virtual conference room entrance element;
receive data corresponding to a virtual conference room hosted on a collaboration server and accessible to the plurality of participants on the plurality of client computing devices, the virtual conference room comprising:
a communication wall comprising an embedded audiovisual conference window configured to output an audiovisual stream of at least one participant in the plurality of participants;
a collaboration wall comprising an embedded collaborative whiteboard, the collaborative whiteboard being configured to propagate edits by any participant to other participants in the plurality of participants; and
an application wall comprising a plurality of embedded application widgets, wherein each embedded application widget is linked to an application configured to execute on one or more client computing devices in the plurality of client computing devices, and wherein each embedded application widget is configured to receive user input to the linked application and display application output of the linked application; and
render a three-dimensional representation of at least a portion of the virtual conference room that is customized for a user of the client computing device based at least in part on one or more user parameters associated with the client computing device.

15. The client computing device of claim 14, wherein the instructions that, when executed by at least one of the one or more processors, cause at least one of the one or more processors to render three-dimensional representation of at least a portion of the virtual conference room that is customized for a user of the client computing device based at least in part on one or more user parameters associated with the client computing device further cause at least one of the one or more processors to:
determine whether the user is authorized for an application wall based at least in part on the one or more user parameters; and either:
render the communication wall, the collaboration wall, and the application wall based at least in part on a determination that the user is authorized for an application wall; or
render only the communication wall and the collaboration wall based at least in part on a determination that the user is not authorized for an application wall.

16. The client computing device of claim 14, wherein the instructions that, when executed by at least one of the one or more processors, cause at least one of the one or more processors to render a three-dimensional representation of at least a portion of the virtual conference room that is customized for a user of the client computing device based at least in part on one or more user parameters associated with the client computing device further cause at least one of the one or more processors to:
render the communication wall, the collaboration wall, and the application wall;
populate the application wall with one or more embedded application widgets corresponding to one or more applications that are selected based at least in part on the one or more user parameters associated with the client computing device.

17. The client computing device of claim 16, wherein at least one of the one or more memories has further instructions stored thereon that, when executed by at least one of the one or more processors, cause at least one of the one or more processors to:
- detect selection of an embedded application widget in the one or more embedded application widgets;
- execute an application linked to the selected embedded application widget; and
- render an application interface of the application within the selected embedded application widget, the application interface being configured to receive user input to the linked application and display application output.

18. The client computing device of claim 14, wherein the plurality of embedded application widgets comprise a file sharing application widget corresponding to a file sharing application, the file sharing application being configured to store one or more files associated with each meeting conducted in the virtual conference room in a container corresponding to a meeting identifier of the meeting.

19. The client computing device of claim 14, wherein:
- the chat interface is configured to receive and display textual communications between the two or more participants;
- the file sharing application is configured to share one or more files received from a participant with other participants; and
- the file editing application is configured to permit the two or more participants to concurrently edit a shared file.

20. The client computing device of claim 19, wherein the virtual lobby is rendered on the user interface of the client computing device based at least in part on the one or more user parameters.

21. At least one non-transitory computer-readable medium storing computer-readable instructions that, when executed by a client computing devices, cause the client computing device to:
- receive data corresponding to a virtual lobby hosted on a collaboration server and accessible to two or more participants in a plurality of participants on two or more client computing devices in a plurality of computing devices, the virtual lobby comprising a chat interface, a file sharing application interface, a file editing interface, and a virtual conference room entrance element;
- render the virtual lobby on a user interface of the client computing device;
- detect selection of the virtual conference room entrance element;
- terminate rendering of the virtual lobby based at least in part on the selection of the virtual conference room entrance element;
- receive data corresponding to a virtual conference room hosted on a collaboration server and accessible to the plurality of participants on the plurality of client computing devices, the virtual conference room comprising:
  - a communication wall comprising an embedded audio-visual conference window configured to output an audiovisual stream of at least one participant in the plurality of participants;
  - a collaboration wall comprising an embedded collaborative whiteboard, the collaborative whiteboard being configured to propagate edits by any participant to other participants in the plurality of participants; and
  - an application wall comprising a plurality of embedded application widgets, wherein each embedded application widget is linked to an application configured to execute on one or more client computing devices in the plurality of client computing devices, and wherein each embedded application widget is configured to receive user input to the linked application and display application output of the linked application; and
- render a three-dimensional representation of at least a portion of the virtual conference room that is customized for a user of the client computing device based at least in part on one or more user parameters associated with the client computing device.

22. The at least one non-transitory computer-readable medium of claim 21, wherein the instructions that, when executed by the client computing device, cause the client computing device to render three-dimensional representation of at least a portion of the virtual conference room that is customized for a user of the client computing device based at least in part on one or more user parameters associated with the client computing device further cause the client computing device to:
- determine whether the user is authorized for an application wall based at least in part on the one or more user parameters; and either:
  - render the communication wall, the collaboration wall, and the application wall based at least in part on a determination that the user is authorized for an application wall; or
  - render only the communication wall and the collaboration wall based at least in part on a determination that the user is not authorized for an application wall.

23. The at least one non-transitory computer-readable medium of claim 21, wherein the instructions that, when executed by the client computing device, cause the client computing device to render a three-dimensional representation of at least a portion of the virtual conference room that is customized for a user of the client computing device based at least in part on one or more user parameters associated with the client computing device further cause the client computing device to:
- render the communication wall, the collaboration wall, and the application wall;
- populate the application wall with one or more embedded application widgets corresponding to one or more applications that are selected based at least in part on the one or more user parameters associated with the client computing device.

24. The at least one non-transitory computer-readable medium of claim 23, further storing computer-readable instructions that, when executed by the client computing device, cause the client computing device to:
- detect selection of an embedded application widget in the one or more embedded application widgets;
- execute an application linked to the selected embedded application widget; and
- render an application interface of the application within the selected embedded application widget, the application interface being configured to receive user input to the linked application and display application output.

25. The at least one non-transitory computer-readable medium of claim 21, wherein the plurality of embedded application widgets comprise a file sharing application widget corresponding to a file sharing application, the file sharing application being configured to store one or more files associated with each meeting conducted in the virtual conference room in a container corresponding to a meeting identifier of the meeting.

26. The at least one non-transitory computer-readable medium of claim 21, wherein:

the chat interface is configured to receive and display textual communications between the two or more participants;

the file sharing application is configured to share one or more files received from a participant with other participants; and the file editing application is configured to permit the two or more participants to concurrently edit a shared file.

27. The at least one non-transitory computer-readable medium of claim 26, wherein the virtual lobby is rendered on the user interface of the client computing device based at least in part on the one or more user parameters.

* * * * *